United States Patent [19]
Yamaguchi et al.

[11] Patent Number: 5,637,839
[45] Date of Patent: Jun. 10, 1997

[54] ULTRASONIC COORDINATE INPUT APPARATUS

[75] Inventors: Nobuyasu Yamaguchi; Hiroshi Ishikawa; Yasuhide Iwamoto; Atsuo Iida, all of Kawasaki, Japan

[73] Assignee: Fujitsu Limited, Kawasaki, Japan

[21] Appl. No.: 366,321

[22] Filed: Dec. 29, 1994

[30] Foreign Application Priority Data

Mar. 15, 1994 [JP] Japan ................................. 6-044389
Jun. 24, 1994 [JP] Japan ................................. 6-143536

[51] Int. Cl.⁶ ............................................. G08C 21/00
[52] U.S. Cl. ............................ 178/19; 345/177; 367/907
[58] Field of Search ................ 178/18, 19; 345/177; 367/907

[56] References Cited

FOREIGN PATENT DOCUMENTS 1-126716  5/1989  Japan.

*Primary Examiner*—Curtis Kuntz
*Assistant Examiner*—Paul Loomis
*Attorney, Agent, or Firm*—Armstrong, Westerman, Hattori, McLeland & Naughton

[57] ABSTRACT

An ultrasonic coordinate input, apparatus comprising a plurality of ultrasonic wave receivers to receive ultrasonic wave emitted by a cordless ultrasonic pen and propagating in an ultrasonic propagating medium, a plurality of receiving circuits for detecting the rising edges of received signals of the ultrasonic wave receivers, a measuring circuit for measuring the difference in time of receiving ultrasonic wave between the ultrasonic wave receivers and a calculating circuit for calculating the coordinates of ultrasonic wave input position according to the result of measurement. When the receiving circuits, the measuring circuit and the calculating circuit are installed together with the ultrasonic wave receivers on the ultrasonic propagating medium, the entire apparatus can be made small in size.

20 Claims, 30 Drawing Sheets

$t_1, t_2$ : PROPAGATION TIME

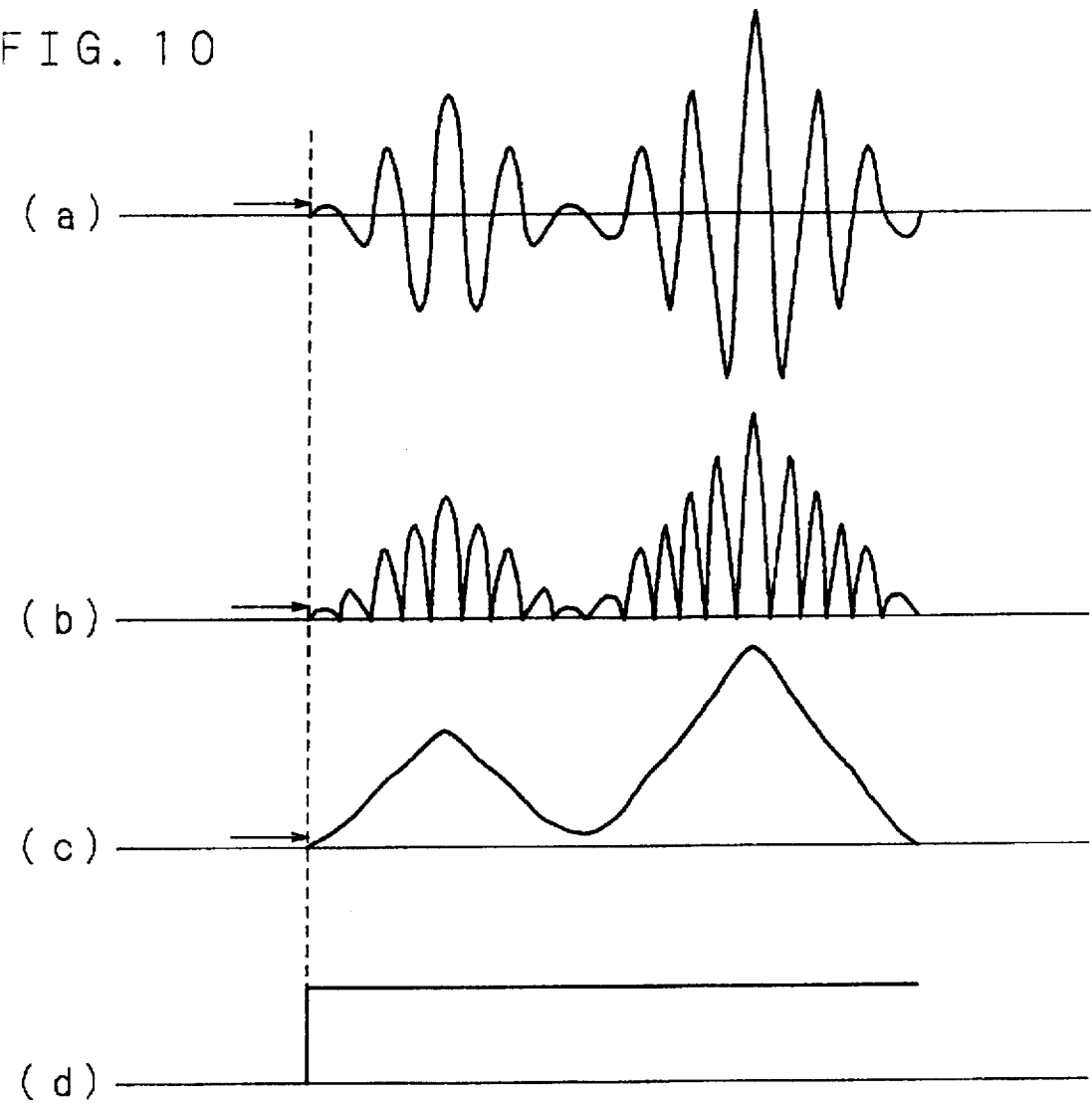

G1: ULTRASONIC WAVE
RECEIVER 5a
ULTRASONIC WAVE
RECEIVER 5b
ULTRASONIC WAVE
RECEIVER 5c

G2: ULTRASONIC WAVE
RECEIVER 5a
ULTRASONIC WAVE
RECEIVER 5b
ULTRASONIC WAVE
RECEIVER 5d

G3: ULTRASONIC WAVE
RECEIVER 5a
ULTRASONIC WAVE
RECEIVER 5c
ULTRASONIC WAVE
RECEIVER 5d

G4: ULTRASONIC WAVE
RECEIVER 5b
ULTRASONIC WAVE
RECEIVER 5c
ULTRASONIC WAVE
RECEIVER 5d

FIG. 24
S WAVE 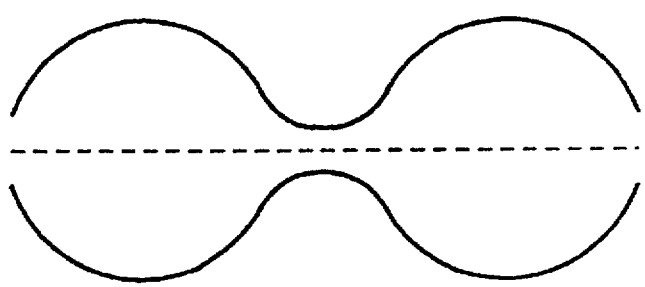
A WAVE 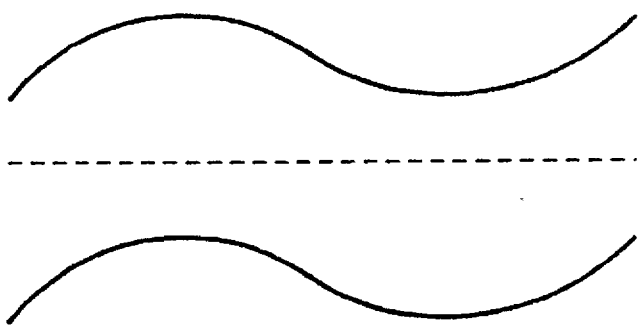

So WAVE    Ao WAVE

●——— : TRACE BY ULTRASONIC PEN 40 ON ULTRASONIC PROPAGATING MEDIUM 38

●----- : TRACE DISPLAYED ON DISPLAY 39

ULTRASONIC COORDINATE INPUT APPARATUS

BACKGROUND OF THE INVENTION

1. Field of the Invention

The present invention relates to an ultrasonic coordinate input apparatus for determining input coordinates by utilizing the propagation of ultrasonic wave generated by ultrasonic input means such as ultrasonic pen.

2. Description of Related Art

As the computer technology advances, apparatuses based on pen input method, wherein handwritten letters and diagrams are inputted to a processing apparatus such as a computer by means of a pen-like device, are attracting much attention as new man-machine interfaces in recent years. The pen input apparatus has a display device and a coordinate detection device being combined, whereas letter or the like is inputted by a pen on the display screen of the display device and the coordinates of the pen are detected by the coordinate detection device so that various information is displayed on the display device according to the result of detection.

Major methods known at present, for the coordinate detection device for the pen input apparatus are electromagnetic induction method, resistive membrane method and ultrasonic wave method. With the electromagnetic induction method, because an opaque coordinate sensing panel with a special receiving coil pattern disposed thereon is used as a receiving device, it is necessary to install the panel on back of the display device. With the resistive membrane method, because a resistive membrane glass panel having been subjected to a special process to form a transparent conductive thin film over the entire surface thereof is used as the coordinate detection unit, transmittance for the displaying light decreases to make the displayed items difficult to recognize for the eye and the electricity consumed for display increases.

For the reasons described above, such ultrasonic coordinate input, apparatuses are widely used as ultrasonic wave is emitted by an ultrasonic pen provided with an ultrasonic wave generating element and is propagated through an ultrasonic propagating medium, while the propagated ultrasonic wave is detected by a plurality of piezoelectric oscillators installed on the ultrasonic propagating medium, thereby to determine the coordinates of the ultrasonic pen on the ultrasonic propagating medium.

FIG. 1 is a schematic diagram showing the basic configuration of the ultrasonic coordinate input apparatus as described above. FIGS. 2A, B are drawings to explain the principle of detecting the coordinates in the ultrasonic coordinate input apparatus. In the drawings, numeral 41 denotes an ultrasonic pen having a piezoelectric oscillator for oscillating ultrasonic waves, while the ultrasonic pen 41 is in contact with the ultrasonic propagating medium 42 that propagates ultrasonic waves. Installed on the periphery of the ultrasonic propagating medium 42 are a plurality of (three in this example) receiving sensors (receiving piezoelectric oscillators) 43, that receive the ultrasonic wave propagated through the ultrasonic propagating medium 42, being bonded with a conductive adhesive. Ultrasonic wave emitted by the ultrasonic wave input pen 41 propagates as Lamb wave in the ultrasonic propagating medium 42 and is received by the receiving sensors 43. An ultrasonic wave detection circuit 44 including a pre-amplifier and other components detects the ultrasonic wave received by the receiving sensors 43 and sends the detection signal to an arithmetic circuit 45. The arithmetic circuit 45 carries out arithmetic operations to be described later on the detection signal received from the ultrasonic wave detection circuit 44, thereby to determine the coordinates. The coordinates determined are displayed on a display 46.

The principle of detecting the coordinates will be described below. As shown in FIGS. 2A, B, the coordinates can be determined on the basis of the time required for the ultrasonic wave emitted by the ultrasonic pen 41 to propagate in the ultrasonic propagating medium 42 and reach the two receiving sensors 43 and to be received thereby. Assume that ultrasonic wave is emitted by the ultrasonic pen 41 at a point P(x, y), the two receiving sensors 43, 43 are located at A(0, 0) and B(L, 0), the ultrasonic wave propagates in the ultrasonic propagating medium 42 at a velocity C, time required to propagate between the points P and A is $t_1$, and time required to propagate between the points P and B is $t_2$, then the coordinates of the point P can be determined as follows. Quantities L and C are knows and $t_1$ and $t_2$ are measured values.

$$(C \cdot t_1)^2 = x^2 + y^2 \tag{1}$$

$$(C \cdot t_2)^2 = (L-x)^2 + y^2 \tag{2}$$

Subtracting (1) from (2) yields the following.

$$x = \{C^2(t_1^2 - t_2^2) + L^2\}/2L \tag{3}$$

From (1) and (3) the following equation is derived.

$$y = \{C^2 t_1^2 - \{L^2 + C^2(t_1^2 - t_2^2)\}^2/4L^2\}^{1/2} \tag{4}$$

FIG. 3 is a drawing showing the configuration of an ultrasonic coordinate input apparatus of the prior art disclosed in Japanese Patent Application Laid-Open No. 1-126716(1989). In FIG. 3, components identical with those shown in FIG. 1 are denoted by the same reference numerals and a drawing of the ultrasonic pen is omitted. In this example, the pre-amplifier 47 is not incorporated in the ultrasonic wave detection circuit 44 but is separated therefrom, and the three pre-amplifiers 47 are installed in a propagating medium mounting member 48 provided for mounting the ultrasonic propagating medium 42 on the display 46 and are connected to the corresponding receiving sensors 43 by means of wires 49 about several tens of millimeters long.

FIG. 4 is a drawing showing the configuration of an ultrasonic coordinate input, apparatus of the prior art disclosed in the Japanese Patent Application Laid-Open No. 1-126716 (1989) described above as another embodiment. The ultrasonic propagating medium 42 is placed on the propagating medium mounting member 48, and a printed circuit board 50, whereon three receiving sensors 43 and three pre-amplifiers 47 each connected to corresponding one of the receiving sensors 43 by means of a wire 49 about several tens of millimeters long are formed, is installed on the ultrasonic propagating medium 42.

In an ultrasonic coordinate input apparatus of an ultrasonic wave type, because the coordinates are determined by measuring the delay time required for the ultrasonic wave signal emitted by the ultrasonic pen 41 to propagate in the ultrasonic propagating medium 42 and to reach the receiving sensor 43, it is necessary to input the time when the ultrasonic pen 41 emits the ultrasonic wave to the arithmetic circuit 45 as the reference time for measuring the delay time. Therefore, the ultrasonic pen 41 must be connected to the main unit with a cord 51, resulting in inconvenience as the cord 51 causes hindrance to the operation in the case of the coordinate input apparatus of the prior art.

In the configuration shown in FIG. 3, because the pre-amplifier 47 and other components are mounted on the propagating medium mounting member 48 located on the periphery of the ultrasonic propagating medium 42 and the pre-amplifiers 47 and the receiving sensors 43 are connected with the wires 49, a large-sized propagating medium mounting member 48 is required to install the ultrasonic propagating medium 42, resulting in a problem that the entire apparatus becomes large in size.

The configuration shown in FIG. 4 has a problem that the display is obscured by the printed circuit board 50 when the ultrasonic coordinate input apparatus is installed on the display. Although a transparent printed circuit board may be used with a wiring pattern being formed outside the display section of the display and the pre-amplifiers and other components installed outside the display section, such problems remain as increased parallax and decreasing transmittance.

SUMMARY OF THE INVENTION

An object of the invention is to provide an ultrasonic coordinate input apparatus having better operability by measuring the difference in the receiving time of ultrasonic wave signal between receiving sensors and accordingly calculating the coordinates, thereby eliminating the need for exchange of information on the oscillation timing between the ultrasonic pen and the main unit and eliminating the need for the cord of the ultrasonic pen.

Another object of the invention is to provide an ultrasonic coordinate input apparatus capable of detecting the input coordinates with a high accuracy, by installing an ultrasonic wave detection circuit for detecting ultrasonic wave and/or an arithmetic circuit for determining the input coordinates on an ultrasonic propagating medium, thereby reducing the size of the mounting member for mounting the ultrasonic propagating medium on the display device, thereby to reduce the size of the entire apparatus, too, and making the wires connecting the receiving sensors and the ultrasonic wave detection circuit shorter resulting in reduced noise.

The ultrasonic coordinate input apparatus of the invention has at least three ultrasonic wave receivers installed at arbitrarily selected different positions of an ultrasonic propagating medium, measuring means for measuring the difference in time of receiving the ultrasonic wave between the ultrasonic wave receivers, and calculating means for calculating the coordinates of the ultrasonic wave input position according to the result of measurement by the measuring means. Because the coordinates are calculated according to the measurement of the difference in time of receiving the ultrasonic wave between the ultrasonic wave receivers, the ultrasonic coordinates can be calculated from the difference in the receiving time that can be measured regardless of the timing of oscillation by the ultrasonic wave input means (ultrasonic pen), and therefore the ultrasonic pen can be used without a cord. Also the entire construction can be made smaller when the measuring means and/or the calculating means are installed on the ultrasonic propagating medium.

When the rising edge of the first crest of symmetrical plate wave, the fastest, among ultrasonic waves propagating in an ultrasonic propagating medium, is received by the ultrasonic wave receivers, asymmetrical plate wave received later than the symmetrical plate wave or the effect, of an edge of the ultrasonic propagating medium can be eliminated thereby making it unnecessary to install an ultrasonic wave absorber around the periphery of the ultrasonic propagating medium.

Also when the ultrasonic wave receivers are arranged to receive the symmetrical plate wave that is the fastest among ultrasonic waves propagating in the ultrasonic propagating medium and the symmetrical plate wave received by each ultrasonic wave receiver is full-wave rectified while the rising edge of the first crest or the envelop component thereof is detected to measure the difference in the time of receiving the ultrasonic wave according to the result of detection, then the measurement error can be reduced even when it is unknown whether the first crest of the received ultrasonic wave signal begins with rising or falling.

Also because movement (up-down) of the ultrasonic wave input means (ultrasonic pen) is recognized on the basis of whether ultrasonic wave is received by the ultrasonic wave receivers in a predetermined period of time determined to be equal to or longer than either the longest time difference of receiving between the ultrasonic wave receivers or an integral multiple thereof, or alternatively a period of time longer than this, it can be accurately detected whether the ultrasonic pen is in contact with the ultrasonic propagating medium or not.

Also when calculation of the coordinates of the ultrasonic wave input position and/or recognition of the movement of the ultrasonic wave input means (ultrasonic pen) are carried out according to an ultrasonic wave signal received after a predetermined number of signals by ignoring the predetermined number of received signals at the start of reception by the ultrasonic wave receivers, erroneous detection due to unstable reception of the first ultrasonic wave signals can be prevented.

When the amplification factors of the amplifiers that amplify the signals received by the ultrasonic wave receivers are adjusted according to the amplitudes of the signals received by the respective ultrasonic wave receivers, it is made possible to adjust the difference in the level of the received ultrasonic wave signal due to the change in the contact pressure of the ultrasonic wave input means (ultrasonic pen) against the ultrasonic propagating medium.

When the amplification factors of the amplifiers that amplify the signals received by the ultrasonic wave receivers are adjusted according to calculated distances of the ultrasonic wave input position from the respective ultrasonic wave receivers, it is made possible to adjust the difference in the level of the received ultrasonic wave signal due to the change in the condition of contact of the ultrasonic wave input means (ultrasonic pen) with the ultrasonic propagating medium, thereby improving the accuracy of calculating the coordinates.

Another ultrasonic coordinate input apparatus of the invention has at least four ultrasonic wave receivers installed at arbitrarily selected different positions of the ultrasonic propagating medium, measuring means for measuring the difference in time of receiving the ultrasonic wave between the ultrasonic wave receivers, first calculating means for calculating a plurality of coordinate sets of the ultrasonic wave input position according to the results of measurement by the measuring means between a set of three ultrasonic wave receivers and second calculating means for calculating the coordinates of the ultrasonic wave input position according to the results of the plurality of calculations by the first calculating means. Because the final values of coordinates are calculated by first calculating a plurality of coordinate sets, then averaging the plurality of coordinate sets thus calculated, errors are reduced and the accuracy of calculation is further improved.

Further another ultrasonic coordinate input apparatus of the invention has a plurality of ultrasonic wave receivers installed at different positions of the ultrasonic propagating medium with one or more thereof being fixed at predetermined positions, and calculating means for calculating the coordinates of the ultrasonic wave input position on the basis of ultrasonic wave signals received by the one or more ultrasonic wave receivers fixed at the predetermined positions and one or more ultrasonic wave receivers selected in the order of timing, from early to late, of detecting the ultrasonic wave signal from the remaining ultrasonic wave receivers. Because some of the plurality of ultrasonic wave receivers are invariably used and an ultrasonic wave receiver nearest to the ultrasonic wave input means (ultrasonic pen) among the remaining ultrasonic wave receivers is used, the sensitivity of receiving the ultrasonic wave signal used in the calculation of coordinates is not decreased and the accuracy of calculation is improved.

The ultrasonic wave signal can be received more efficiently when two ultrasonic wave receivers are fixed on a diagonal or one edge of the ultrasonic propagating medium.

Further another ultrasonic coordinate input apparatus of the invention has an ultrasonic wave detection circuit installed on the ultrasonic propagating medium, for detecting ultrasonic wave from the received signals of a plurality of piezoelectric oscillators that receive ultrasonic wave propagated through the ultrasonic propagating medium. An arithmetic circuit for calculating the coordinates of ultrasonic wave input positions according to the result of detection by the ultrasonic wave detection circuit is also installed on the ultrasonic propagating medium. Because only the ultrasonic wave detection circuit or both the ultrasonic wave detection circuit and the arithmetic circuit are installed on the ultrasonic propagating medium together with the plurality of receiving piezoelectric oscillators, it is not necessary to provide an area for forming circuitry on the propagating medium mounting member unlike the prior art, the propagating medium mounting member can be reduced in size. Also because the ultrasonic wave detection circuit is installed in close proximity to the receiving piezoelectric oscillator, the need for long wires as in the case of the prior art is eliminated resulting in a circuit that has higher resistance to noise.

The ultrasonic wave detecting circuit is installed outside the area surrounded by the plurality of piezoelectric oscillators and outside the ultrasonic wave input area. The arithmetic circuit is also installed outside the area surrounded by the plurality of piezoelectric oscillators and outside the ultrasonic wave input area. Because only the ultrasonic wave detecting circuit, or both the ultrasonic wave detection circuit and the arithmetic circuit are installed outside the area surrounded by the plurality of piezoelectric oscillators and outside the ultrasonic wave input area, the display device is not obscured by the printed circuit board or the pre-amplifier unlike the prior art, making the display always visible. Also there are no circuit substrate or circuits interposed between the display device and the ultrasonic propagating medium, and there arises no problem of increased parallax or decreased transmittance.

When a conductive membrane is installed on a surface opposite to the ultrasonic wave input surface of the ultrasonic propagating medium, electromagnetic noise is shielded by the conductive membrane in case the ultrasonic coordinate input apparatus is installed on a display device that generates electromagnetic noise.

Also when the ultrasonic wave fastest among ultrasonic waves propagating in the ultrasonic propagating medium is received by the piezoelectric oscillators, unnecessary ultrasonic waves reflecting at an edge of the ultrasonic propagating medium can be ignored.

The above and further objects and features of the invention will more fully be apparent from the following detailed description with accompanying drawings.

BRIEF DESCRIPTION OF THE DRAWINGS

FIG. 10 is a chart showing waveforms at different parts of the receiving circuit.

FIG. 24 is a drawing showing the waveform of an ultrasonic wave propagating in an ultrasonic propagating medium.

DESCRIPTION OF THE PREFERRED EMBODIMENTS

The invention will now be described in detail below with reference to the accompanying drawings showing the preferred embodiments thereof.

Embodiment 1

Figure 5:
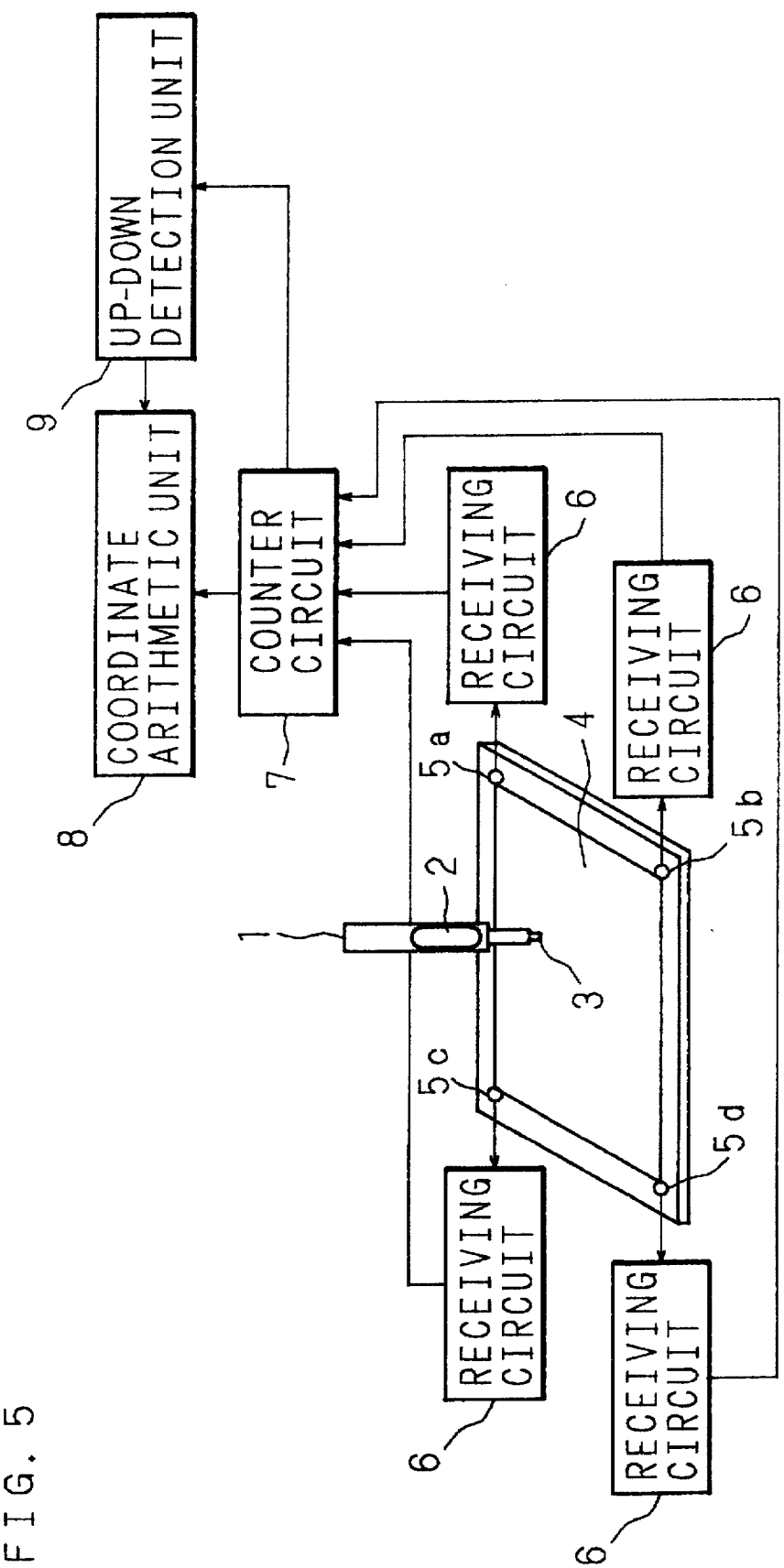
FIG. 5 is a drawing showing the configuration of an embodiment of an ultrasonic coordinate input apparatus of the invention.

FIG. 5 is a schematic configuration diagram of a first embodiment of the ultrasonic coordinate input apparatus of the invention. Numeral 1 denotes an ultrasonic pen for indicating coordinates. The ultrasonic pen 1 has a transmitter 2 transmitting pulse signals of a predetermined frequency and an ultrasonic oscillator 3 generating ultrasonic waves installed therein. Numeral 4 denotes an ultrasonic propagating medium made of a sheet of material having ultrasonic wave propagating property such as glass and acrylic resin, allowing the ultrasonic wave oscillated by the ultrasonic pen 1 to propagate in the ultrasonic propagating medium 4. Installed on the periphery of the ultrasonic propagating medium 4 at different positions are at least three ultrasonic wave receivers 5 that receive ultrasonic wave propagated through the ultrasonic propagating medium 4. In this embodiment shown in FIG. 5, the ultrasonic wave receivers 5a, 5b, 5c, 5d are installed, one at each of the four corners of the ultrasonic propagating medium 4. Each of the ultrasonic wave receivers 5a, 5b, 5c, 5d is provided with a receiving circuit 6 that amplifies the received signal and detects the rising edge thereof. Each receiving circuit 6 is connected to a counter circuit 7 that measures, by means of a pulse counter circuit, the difference in the receiving time between the ultrasonic wave receivers 5a, 5b, 5c, 5d according to the information on the rising edge of the detected signal. The counter circuit 7 is connected to a coordinate arithmetic section 8 that calculates the coordinates on the basis of the measured difference of receiving time. The counter circuit 7 is also connected to an up-down detection unit 9 that recognizes whether the ultrasonic pen 1 is in contact with or apart from the ultrasonic propagating medium 4 according to the output of the counter circuit 7, and outputs the information (hereinafter referred to as up-down detection information of the ultrasonic pen 1) to the coordinate arithmetic unit 8. The coordinate arithmetic unit 8 controls the start and end of the arithmetic operation to calculate the coordinates according to the up-down information of the ultrasonic pen 1 received from the up-down detection unit 9.

Figure 6:
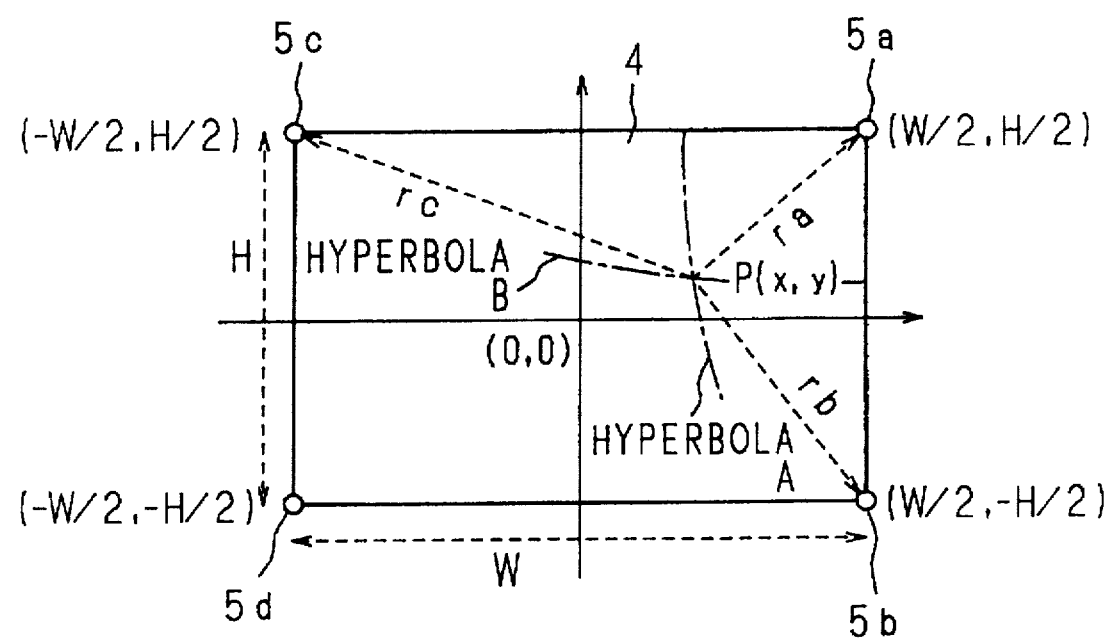
FIG. 6 is a drawing explaining the principle of calculating coordinates in the ultrasonic coordinate input apparatus of the invention.

The principle of calculating the coordinates in the first embodiment will now be described below. FIG. 6 is a drawing for explaining the principle of calculating orthogonal coordinates of a point indicated by the ultrasonic pen 1 on the ultrasonic propagating medium 4. As shown in the drawing, the origin (0, 0) of the coordinate system is set at the center of the ultrasonic propagating medium 4 measuring H in height and W in width (H<W) and each of the ultrasonic wave receivers 5a, 5b, 5c, 5d is installed at each corner thereof. In this case, the coordinates of the ultrasonic wave receivers 5a, 5b, 5c, 5d are (W/2, H/2), (W/2, –H/2), (–W/2, H/2) and (–W/2, –H/2), respectively. The description that follows will deal with a case where the ultrasonic, pen 1 indicates a point P(x, y) in the ultrasonic propagating medium 4 and the coordinates of the input position are calculated by means of the signals received from the three ultrasonic wave receivers 5a, 5b, 5c.

Figure 7:
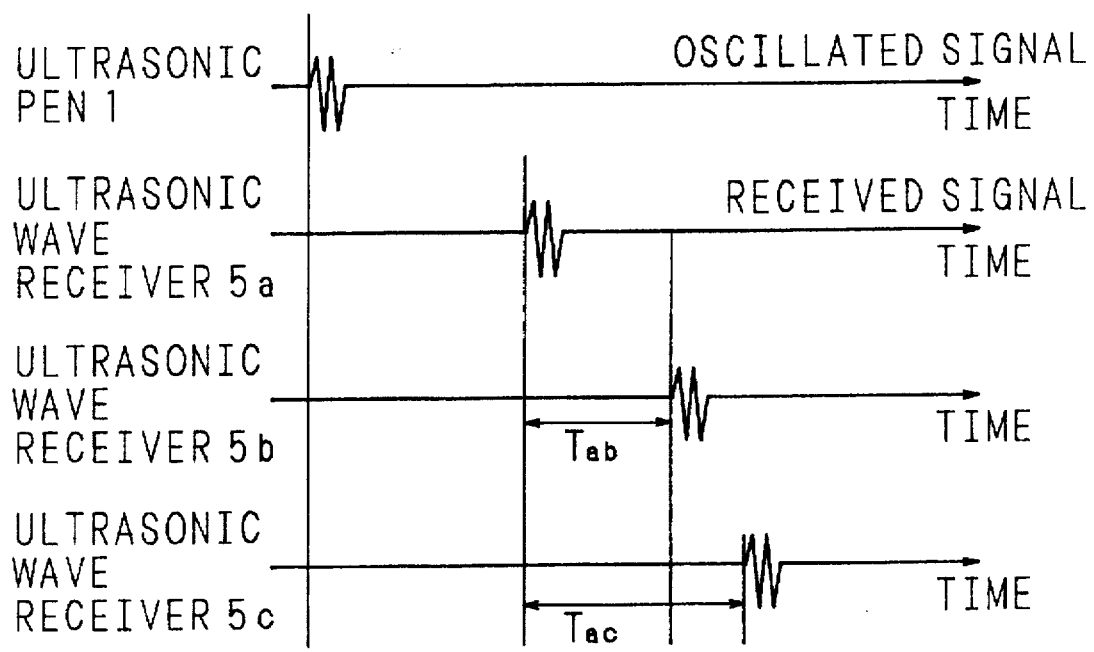
FIG. 7 is a waveform chart of signals oscillated by an ultrasonic pen and received signal of an ultrasonic wave receiver.

FIG. 7 shows a signal oscillated by the ultrasonic pen 1 and signals received by the ultrasonic wave receivers 5a, 5b, 5c. In this case, the signal is received first by the ultrasonic wave receiver 5a followed by the ultrasonic wave receivers 5a, 5b in this order. Thus difference in the time of reception $T_{ab}$, $T_{ac}$ between the ultrasonic wave receivers 5a, 5b and between the ultrasonic wave receivers 5a, 5c are measured respectively.

Let the distances of the point P from the ultrasonic wave receivers 5a, 5b, 5c be $r_a$, $r_b$, $r_c$, respectively. Collection of points, located at such distances from given two points that the difference of the two distances is constant, make a hyperbola having foci at the two points. Therefore when difference $d_{ab}$ between distances of the point P from the ultrasonic wave receiver 5a and the ultrasonic wave receiver 5b and difference $d_{ac}$ between distances of the point P from the ultrasonic wave receiver 5a and the ultrasonic wave receivers 5c are measured, the coordinates of the point P can be obtained as the intersect of a hyperbola A having foci at the points where the ultrasonic wave receiver 5a and the ultrasonic wave receiver 5b are installed and a hyperbola B having foci at the points where the ultrasonic wave receiver 5a and the ultrasonic wave receiver 5c are installed. The values of $d_{ab}$ and $d_{ac}$ can be calculated as follows from the time difference of reception Tab, Tac assuming that the sound velocity is C.

$$d_{ab} = r_b - r_a = C \cdot T_{ab}$$

$$d_{ac} = r_c - r_a = C \cdot T_{ac} \quad (5)$$

Meanwhile $r_a$, $r_b$ and $r_c$ are given by equations (6).

$$r_a^2 = (W/2-x)^2 + (H/2-y)^2$$

$$r_b^2 = (W/2-x)^2 + (H/2+y)^2 \quad (6)$$

$$r_c^2 = (W/2+x)^2 + (H/2-y)^2$$

These equations are combined as follows.

$$r_c^2 - r_a^2 = (r_c - r_a)(r_c + r_a) = (W/2+x)^2 + (W/2-x)^2 = 2Wx$$

$$r_b^2 - r_a^2 = (r_b - r_a)(r_b + r_a) = (H/2+y)^2 + (H/2-y)^2 = 2Hy \quad (7)$$

The following equation is derived from (5) and (7).

$$2r_a = (2Hy - d_{ab}^2)/d_{ab} = (2Wx - d_{ac}^2)/d_{ac} \quad (8)$$

y is given as follows from (8).

$$y = \{(W \cdot d_{ab})/(H \cdot d_{ac})\} \cdot x + (d_{ab}/2H)(d_{ab} - d_{ac}) \quad (9)$$

Last, (8) and (9) are substituted in (5) resulting in the following equation.

$$(W^2 \cdot H^2 - W^2 \cdot d_{ab}^2 - H^2 \cdot d_{ac}^2)x^2 + \qquad (10)$$
$$W \cdot d_{ab} \cdot d_{ac}(H^2 + d_{ab} \cdot d_{bc})x -$$
$$d_{ac}^2\{H^2 \cdot (W^2 - d_{ac}^2) + (H^2 + d_{ab} \cdot d_{bc})^2\}/4 = 0$$

where $$d_{bc} = d_{ac} - d_{ab}.$$

This quadratic equation can be solved as follows.

$$x = \{d_{ac}^2/2\} \times [\{H^2 \cdot (W^2 - d_{ac}^2) + (H^2 + d_{ab} d_{bc})^2\}/\Gamma] \qquad (11)$$

where $$\Gamma = W \cdot d_{ab}(H^2 + d_{ab} \cdot d_{bc}) + \{W^2 \cdot d_{ab}^2(H^2 + d_{ab} d_{bc})^2 + \Delta\}^{1/2}$$
$$\Delta = (W^2 \cdot H_2 - W^2 \cdot d_{ab}^2 - H^2 \cdot d_{ac}^2) \cdot \{H^2 \cdot (W^2 - d_{ac}^2) + (H^2 + d_{ab} d_{bc})^2\}$$

Thus the coordinates of the point P (x, y) can be calculated from (9) and (11). Because the coordinates can be calculated by using the differences $T_{ab}$, $T_{ac}$ in the receiving time that can be measured regardless of the timing of oscillation of the ultrasonic pen 1, the ultrasonic pen 1 can be used without a cord by employing the method described above.

Figure 8:
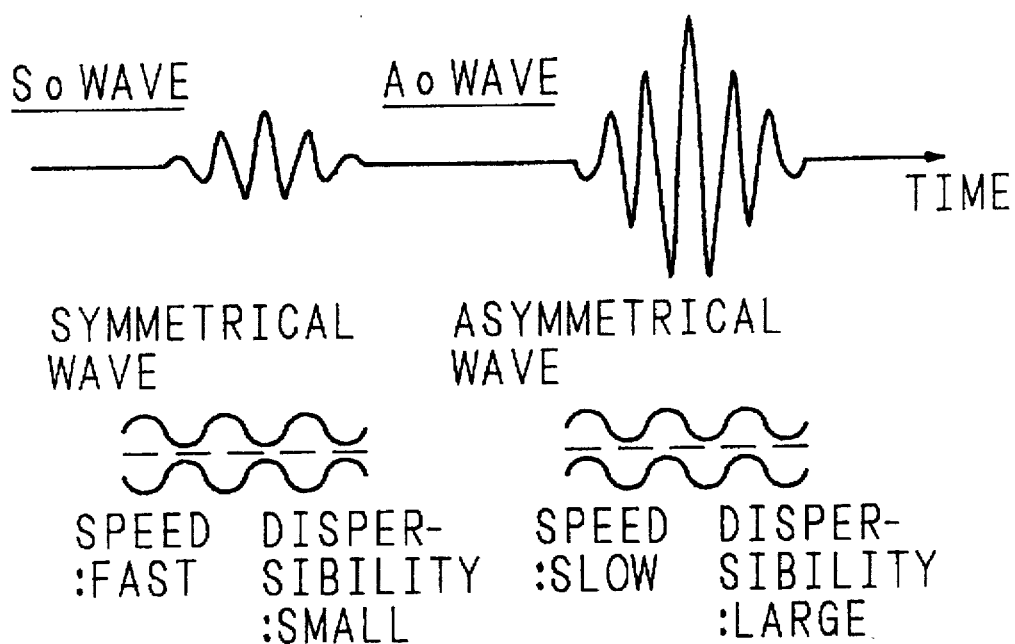
FIG. 8 is a waveform chart showing the characteristics of two kinds of ultrasonic wave signal.

Now the operation of detecting the rising edge of the received signal in the first embodiment will be described. As shown in FIG. 8, ultrasonic wave signal propagating in the ultrasonic propagating medium 4 generally includes two kinds of wave having different characteristics, namely symmetrical plate wave (S0 wave), and asymmetrical plate wave (A0 wave), and higher mode thereof. These waves are composites of longitudinal waves and transverse waves, and generally propagate at different velocities depending on the plate thickness and the frequency. Normally, S0 wave has the fastest propagating velocity and is the first to be received by the ultrasonic wave receiver 5. S0 wave is also less affected by dispersion that creates difference between group velocity and phase velocity of a wave, and therefore is better for detecting the rising edge of the received wave when measuring the propagation time.

In particular, while a signal having a clear rising edge such as a drive pulse of the ultrasonic pen can be used for the timing of starting the measurement, of propagation time with the ultrasonic coordinate input apparatus of the prior art, received waveforms of the ultrasonic wave must be used for the timing of both the start, and end of measurement of the difference in receiving time in the first embodiment, resulting in increasing factors of error compared to the case of the prior art. Therefore S0 wave that is relatively suited to the detection of the rise of received waveform is employed in the first embodiment.

Figure 9A:
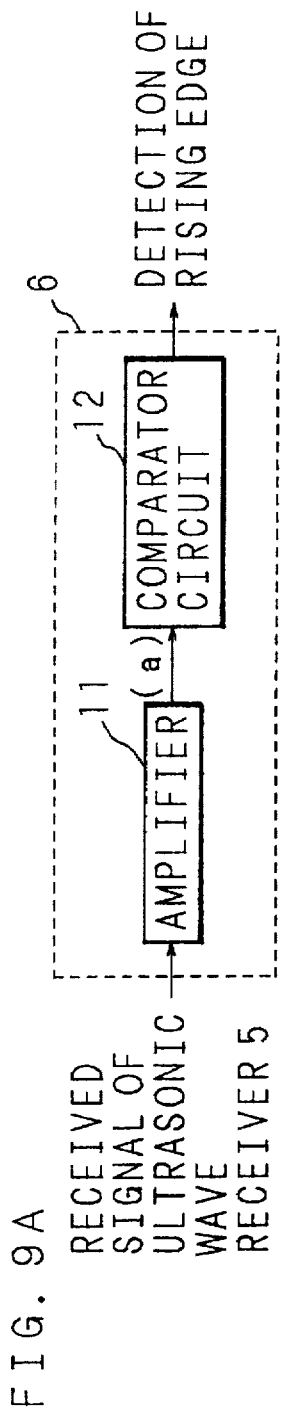
FIGS. 9A, B, C are drawings showing the configuration of a receiving circuit of the ultrasonic coordinate input apparatus of the invention.

FIGS. 9A, B, C show examples of the inner configuration of the receiving circuit 6 in the first embodiment. FIG. 10 shows the signal waveforms at points (a), (b), (c), (d) of FIGS. 9A, B, C.

The receiving circuit 6 of the first example shown in FIG. 9A has an amplifier 11 for amplifying received signals and a comparator circuit 12. The first example of detecting the rising edge is such a method as the level of the first crest of the received ultrasonic wave signal is compared in the comparator circuit 12, and the level is detected to represent a rising edge when it exceeds a predetermined threshold level. With this method, however, detection of the rising edge is carried out by using crests that follow the first crest where the level of the first crest of the received ultrasonic wave signal is below the threshold level. In this case, measured difference in the receiving time includes an error of one wavelength. The error of a half wavelength may also be included depending on whether the first crest begins with rising or falling.

Figure 9B:
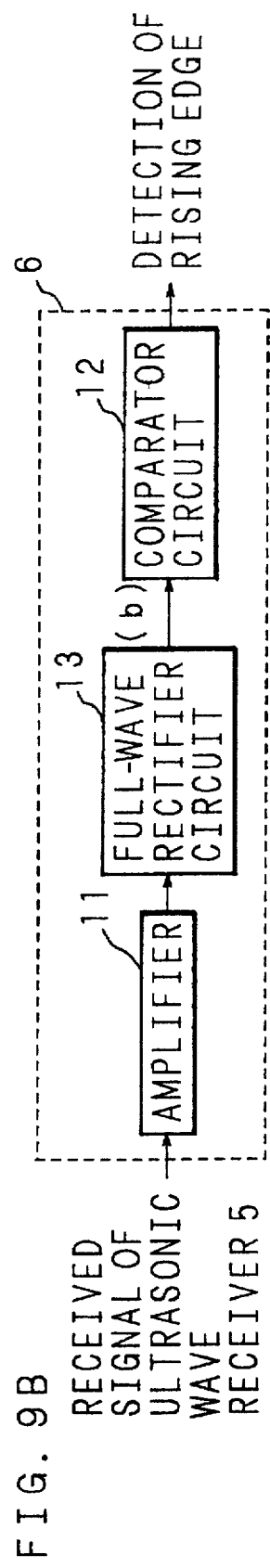

In consideration of the problem described above, the receiving circuit 6 of the second example shown in FIG. 9B has the amplifier 11, a full-wave rectifier circuit 13 and the comparator circuit 12. The second example of detecting the rising edge is such a method as the received ultrasonic wave signal is subjected to full-wave rectification in the full-wave rectifier circuit 13, the level of the first crest of the signal is compared in the comparator circuit 12 and the level is detected to represent a rising edge when it exceeds a specified threshold level. With this method, because the level of the first crest of the received ultrasonic wave signal is below the threshold level, even when detection of the rising edge is carried out by using the crests following the first crest, the difference in the measured receiving time includes an error of only a half wavelength, a half that in the case of the first example.

Figure 9C:
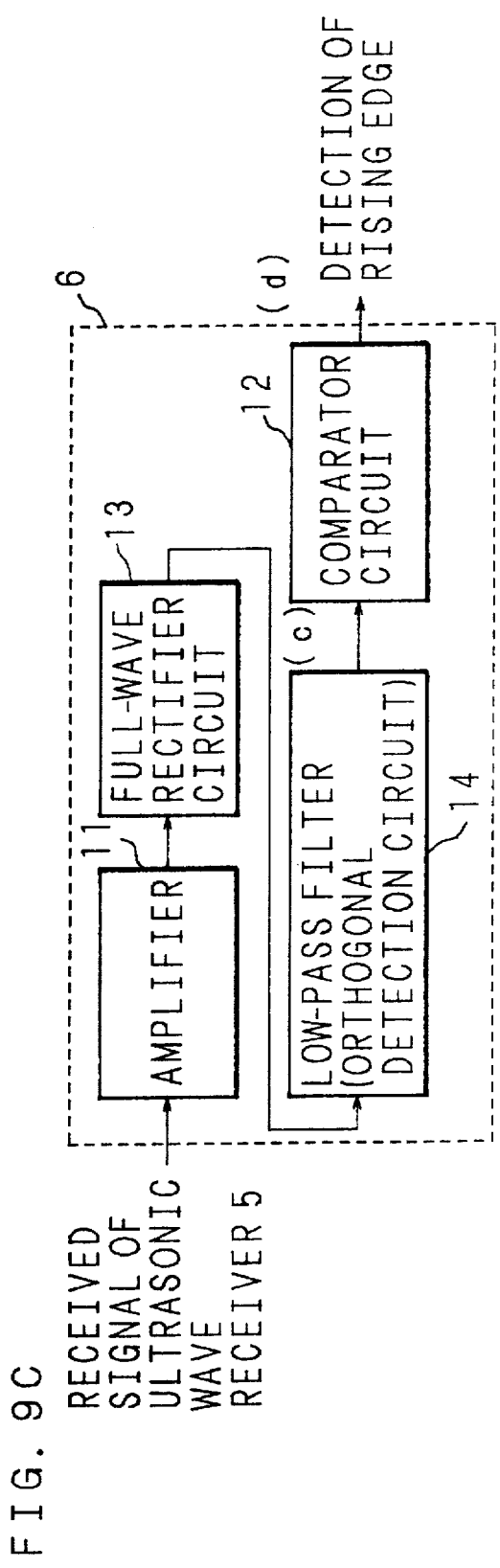

The receiving circuit 6 of the third example shown in FIG. 9C has the amplifier 11, the full-wave rectifier circuit 13, a low-pass filter (or an orthogonal detection circuit) 14 and the comparator circuit 12. The third example of detecting the rising edge is such a method as the received ultrasonic wave signal is subjected to full-wave rectification in the full-wave rectifier circuit 13, an envelope component of the signal is detected by using the low-pass filter (or the orthogonal detection circuit) 14 and the level of the signal is compared in the comparator circuit 12, so that the level is detected to represent a rising edge when it exceeds a threshold level. With this method, even when the level of the first crest of the received ultrasonic wave signal is below the threshold level, the difference in the measured receiving time includes an error of only a half wavelength.

As described above, because the coordinates are calculated by detecting the rising edge of the S0 wave having the fastest velocity and is the first to be received by the ultrasonic wave receiver and moreover the rising edge of the first crest, this process is not affected by waves reflected at edges of the ultrasonic propagating medium 4 that are detected later than the first crest of the S0 wave. Therefore it is not necessary to install an ultrasonic wave absorber around the ultrasonic propagating medium 4 to absorb the reflection from the edges thereof, making it possible to make a more compact ultrasonic coordinate input apparatus.

Now the operation of the up-down detection of the ultrasonic pen 1 carried out in the up-down detection unit 9 to recognize whether the ultrasonic pen 1 is in contact with or apart from the ultrasonic propagating medium 4 in the first embodiment will be described below in detail.

Figure 11:
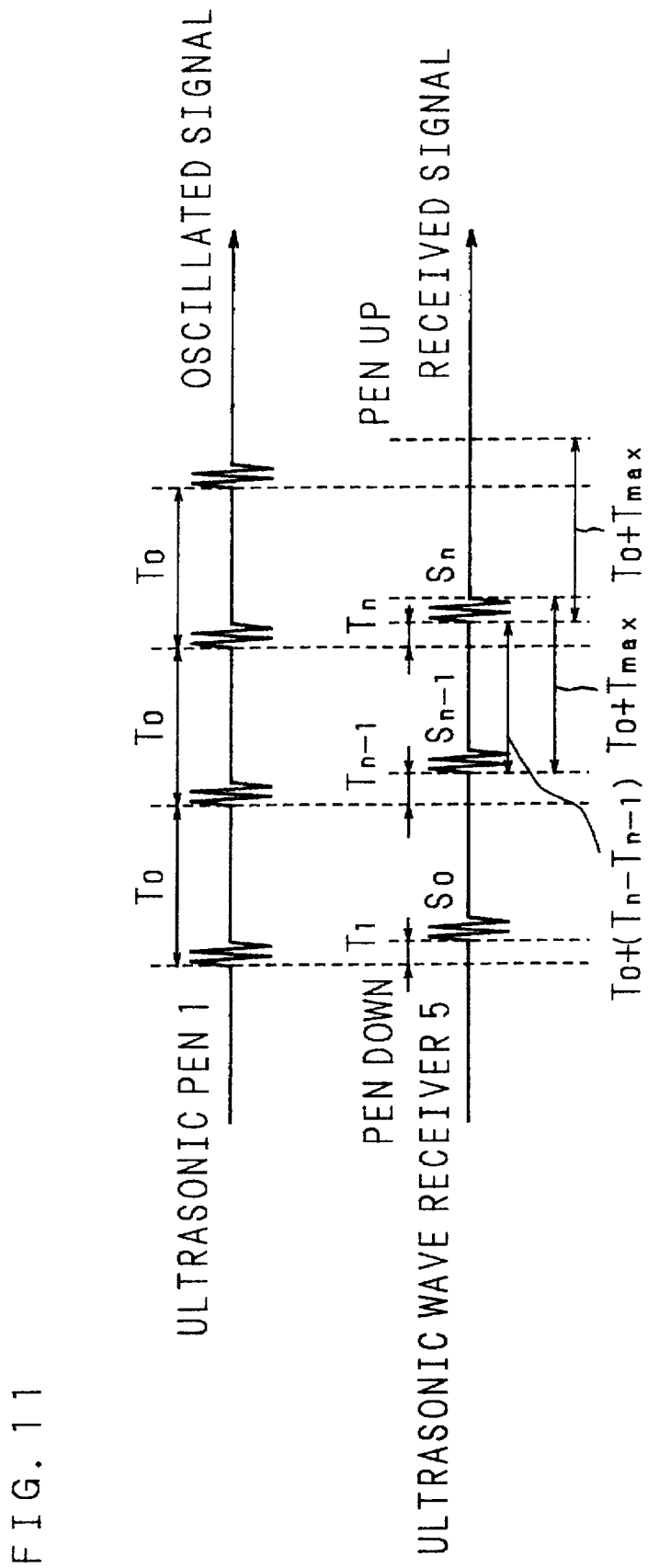
FIG. 11 is a waveform chart explaining an example of detecting up and down movements of the ultrasonic pen.

FIG. 11 shows an example of detecting the up-down movement of the ultrasonic pen 1. When the ultrasonic pen 1 is in contact with the ultrasonic propagating medium 4, the ultrasonic wave receiver 5 receives an ultrasonic wave signal so that it is recognized that the ultrasonic pen 1 has touched (come down) the ultrasonic propagating medium 4. Thereafter the ultrasonic pen 1 generates ultrasonic pulse signals at intervals of period $T_0$.

With attention focused on one ultrasonic wave receiver, an ultrasonic wave signal Sn is received a period of time $T_0 + (T_n - T_{n-1})$ after ultrasonic wave signal Sn−1, the immediate foregoer, when taking into consideration the propagation delay time Tn required for propagating in time ultrasonic propagating medium 4. $(T_n - T_{n-1})$ takes a maximum value Tmax when the ultrasonic pen 1 moves from a point nearest to the ultrasonic wave receiver 5 to a farthest point on the ultrasonic propagating medium 4 within one period. Consequently, when the ultrasonic wave receiver 5 receives the next ultrasonic wave signal within $T_0+T_{max}$ after receiving an ultrasonic wave signal, it is recognized that the ultrasonic pen 1 is down and, when the next ultrasonic wave signal is not received in a period of $T_0+T_{max}$ or longer, it is recognized that the ultrasonic pen 1 is detached from the ultrasonic propagating medium 4.

The reference period $T_0+T_{max}$ for the up-down detection of the ultrasonic pen 1 may be measured by means of a dedicated timing counter or a counter provided in the counter circuit 7 that measures the difference in receiving time may be used, or alternatively, may be measured by means of software.

There may be such a case that one or more ultrasonic wave signals are not detected although it is not intended to lift up the ultrasonic pen 1, due to a flaw on the ultrasonic propagating medium 4, variation in the pressure of holding the ultrasonic pen 1 against the ultrasonic propagating medium 4 or other causes. In such a case, the operation may be improved by giving some redundancy to the up-down detection of the ultrasonic pen 1. In this regard, the period for up-down detection of the ultrasonic pen 1 may be set to $(T_0+T_{max})\times N$ or longer so that the ultrasonic pen 1 is recognized to be in an up position, when ultrasonic wave signal corresponding to N consecutive crests have not been received.

Figure 12:
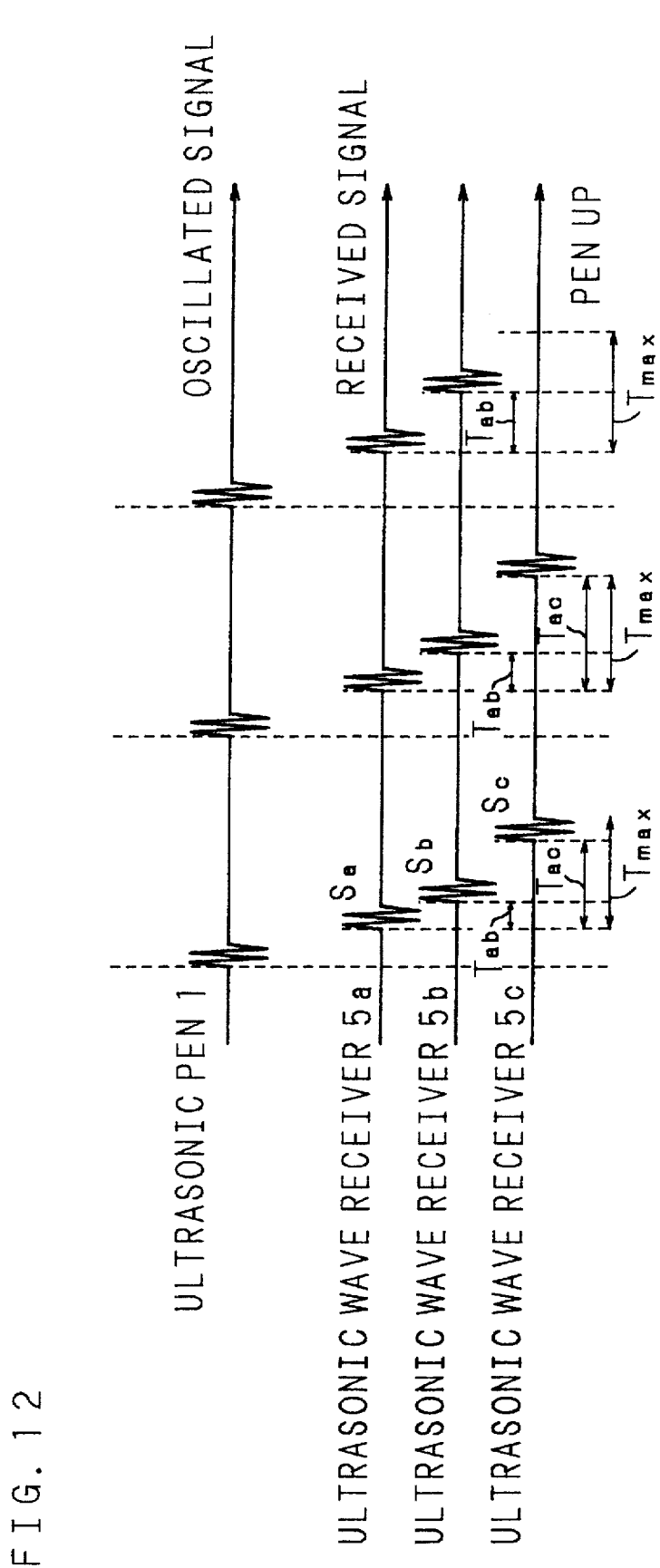
FIG. 12 is a waveform chart explaining another example of detecting the up and down movements of the ultrasonic pen.

FIG. 12 shows the second example of up-down detection of the ultrasonic pen 1. In the second example, up-down detection of the ultrasonic pen 1 is carried out by using a plurality of ultrasonic wave signals. Coordinates are calculated by using differences in receiving time Tab, Tac of the ultrasonic wave signals between the ultrasonic wave receivers as described previously, and the difference in receiving time shows the maximum value Tmax when the ultrasonic pen 1 comes nearest to the ultrasonic wave receiver 5. Thus when ultrasonic wave signals Sb, Sc are received by other ultrasonic wave receivers 5b, 5c within Truax after the first ultrasonic wave signal Sa was received, it is recognized that the ultrasonic pen 1 is in contact with the ultrasonic propagating medium 4 and input of the coordinates is being normally carried out. Conversely, when the ultrasonic wave signals Sb, Sc are not received by other ultrasonic wave receivers 5b, 5c within Tmax or longer after the first ultrasonic wave signal Sa was received, it is recognized that the ultrasonic pen 1 is in up position. This lapse of time can be checked by overflow of a timing counter used in the measurement of the difference in receiving time, or other means.

Figure 13:
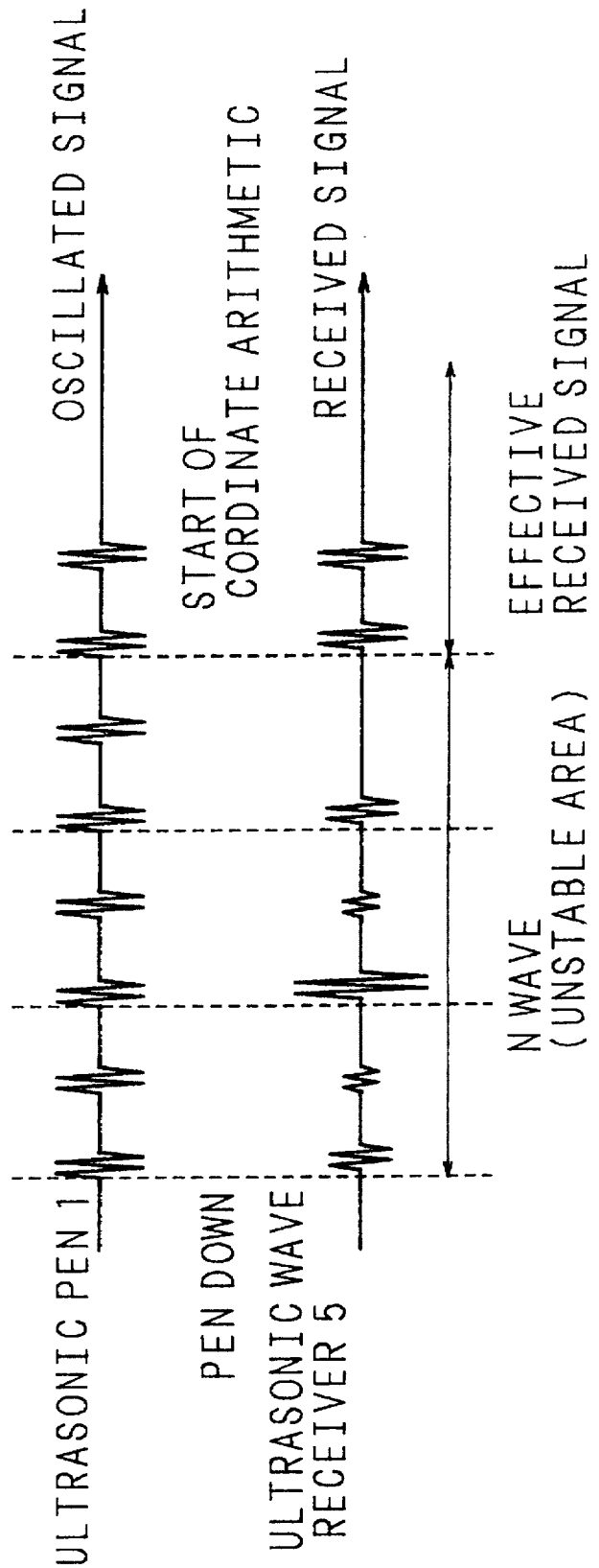
FIG. 13 is a waveform chart explaining the removal of unstable received ultrasonic wave signals.

As shown in FIG. 13, it normally takes time corresponding to several wavelengths of the ultrasonic wave signal for the waveform and level of the ultrasonic wave signal to stabilize, with the condition of contact being stabilized after the ultrasonic pen 1 was put down onto the ultrasonic propagating medium 4. During this period, the accuracy of calculating the coordinates experiences a significant decrease. For this reason, calculation of the coordinates and up-down detection of the ultrasonic pen 1 are carried out by using the received ultrasonic wave signals following the (N+1)th signal as the effective received signals, while ignoring the first N signals among the ultrasonic wave signals received by the ultrasonic wave receiver 5 immediately after the ultrasonic pen 1 made contact, with the ultrasonic propagating medium 4, without carrying out the calculation of the coordinates and the up-down detection of the ultrasonic pen 1 on these signals. This makes it possible to prevent the accuracy of calculating the coordinates from decreasing immediately after the pen down.

As described above, pulses of unstable received signals immediately after the contact, can be ignored by either preventing the pulse from being outputted from the receiving circuits 6 to the counter circuit 7 during the unstable period, or avoiding measuring the difference in receiving time of the pulses of first unstable signals in the counter circuit 7.

Now the adjustment of amplification factor in the receiving circuit 6 in the first embodiment will be described. In the ultrasonic coordinate input apparatus, when the ultrasonic pen 1 is brought into contact with the ultrasonic propagating medium 4, the level of the ultrasonic wave signal may vary significantly depending on the personal peculiarity such as the way the ultrasonic pen 1 is held and the writing pressure. Also when drawing a trace, the level of the ultrasonic wave signal may change significantly due to changes in the condition of contact and the writing pressure. These factors have great influence on the accuracy of calculating the coordinates. Therefore it is necessary to maintain the amplitude of the ultrasonic wave signal as constant as possible.

Figure 14:
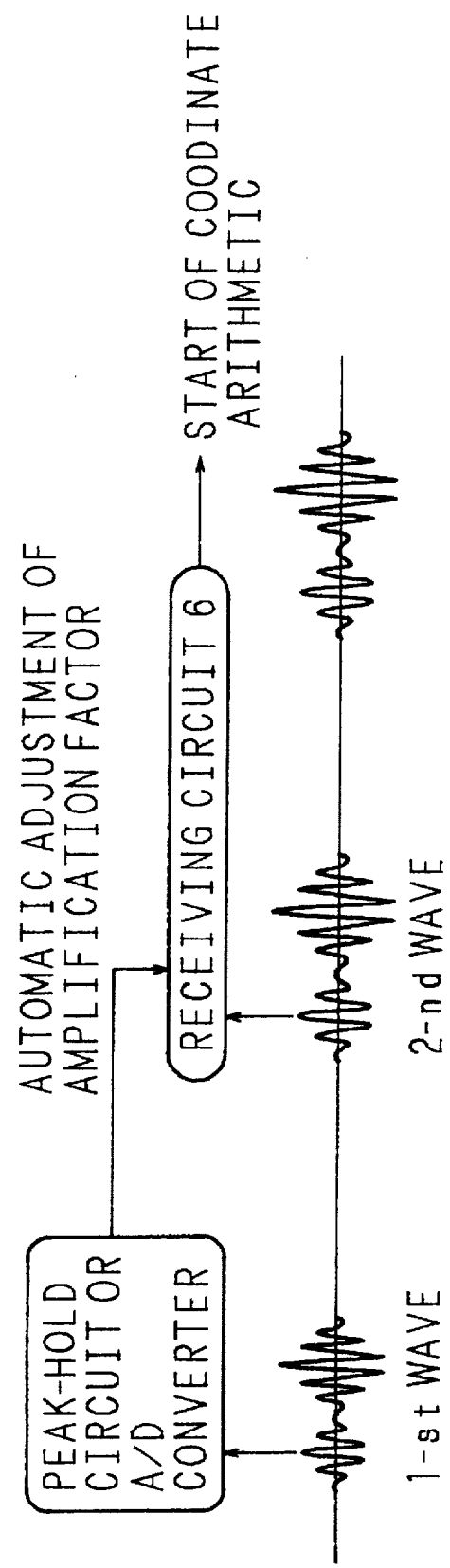
FIG. 14 is a drawing explaining an example of automatic adjustment of the amplification factor of an amplifier of the receiving circuit.

FIG. 14 shows the first example of maintaining the level of the ultrasonic wave signal constant. In this case, the first crest of effective received signal is not used in calculating the coordinates. The level of the ultrasonic wave signal is measured by means of a peak hold circuit or an A/D converter circuit. According to the level, the amplification factor of the amplifier 11 (refer to FIGS. 9A, B, C) in the receiving circuit 6 is adjusted. Thereafter the received signal is amplified with this amplification factor to carry out the subsequent operations such as the calculation of coordinates. This makes it possible to adjust the difference in the level of the received ultrasonic wave signal due to personal peculiarity.

Figure 15:
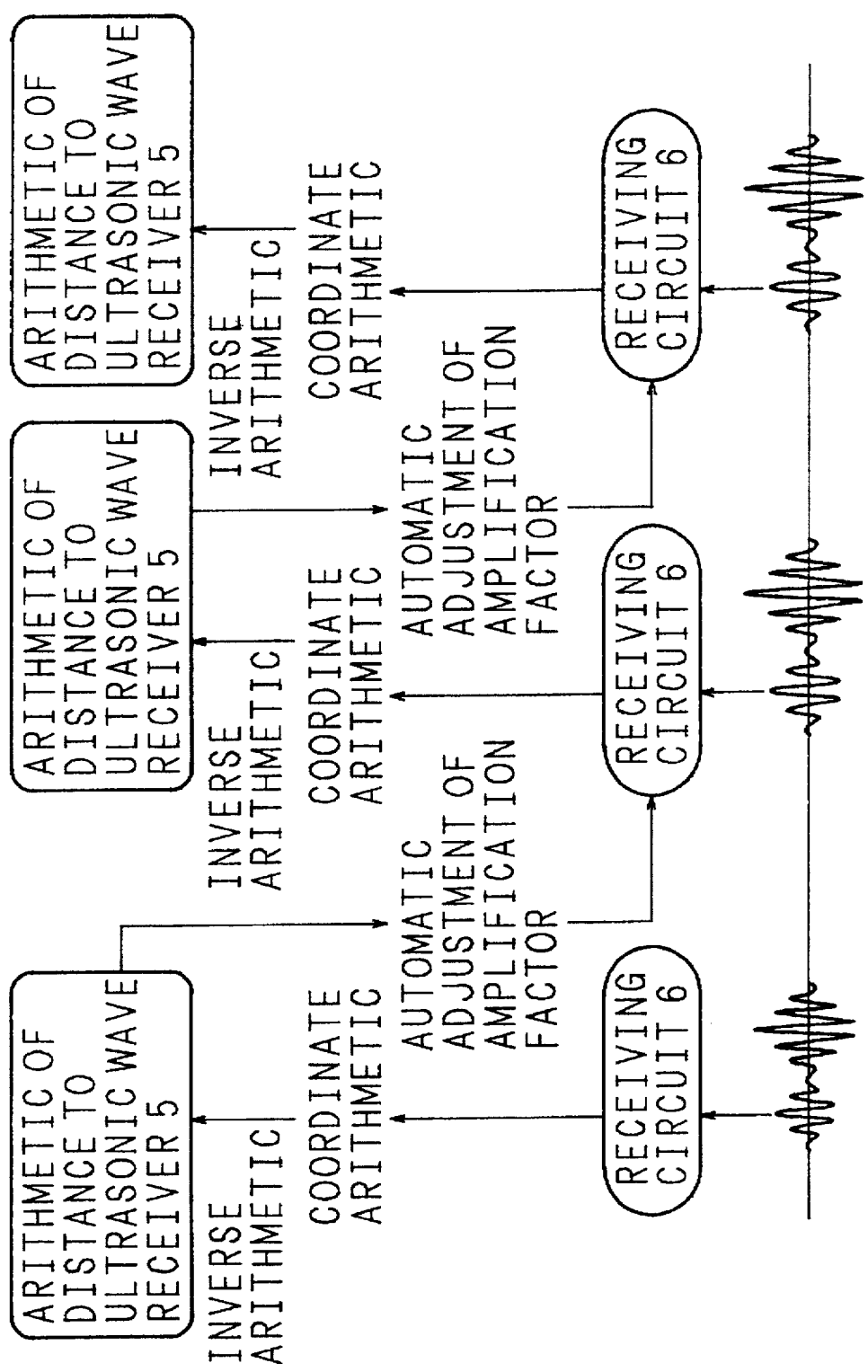
FIG. 15 is a drawing explaining another example of automatic adjustment of the amplification factor of the amplifier of the receiving circuit.

FIG. 15 shows the second example of maintaining the level of the ultrasonic wave signal constant. In this case, distances of the ultrasonic pen 1 from the ultrasonic wave receivers 5 are calculated on the basis of the coordinates of the point indicated by the ultrasonic pen 1 by reverse arithmetic operation after obtaining the coordinates of the point indicated by the ultrasonic pen 1 on the basis of the difference in the receiving time between the ultrasonic wave receivers 5. Based on the distances, the amplification factor of the amplifier 11 in the receiving circuit 6 is adjusted. That is, because the level of the ultrasonic wave signal decreases more significantly when the distance from the ultrasonic wave receiver 5 is greater, the amplification factor of the amplifier 11 in the receiving circuit 6 corresponding to a more distant ultrasonic wave receiver 5 is set higher, so that the amplitude of the ultrasonic wave signal becomes constant. This makes it possible to alleviate the change in the level of the ultrasonic wave signal due to changes in the condition of contact and the writing pressure of the ultrasonic pen 1 when drawing a trace, thereby improving the accuracy of calculating the coordinates.

Now examples of selecting the ultrasonic wave receivers used in calculating the input coordinates in the first embodiment will be described below. In the ultrasonic coordinate input apparatus of the first embodiment, as described above, coordinates can be calculated when the ultrasonic wave signal is received at three ultrasonic wave receivers 5. However, because of attenuation of the received ultrasonic wave due to the distance from the ultrasonic wave receiver 5 or geometrical errors in the calculation of coordinates, calculated coordinates include errors of different magnitudes depending on the combination of the three ultrasonic wave receivers 5. Consequently, accuracy of calculating the coordinates can be improved by taking the mean value of a plurality of pairs of coordinates calculated from a plurality of combinations.

Figure 16:
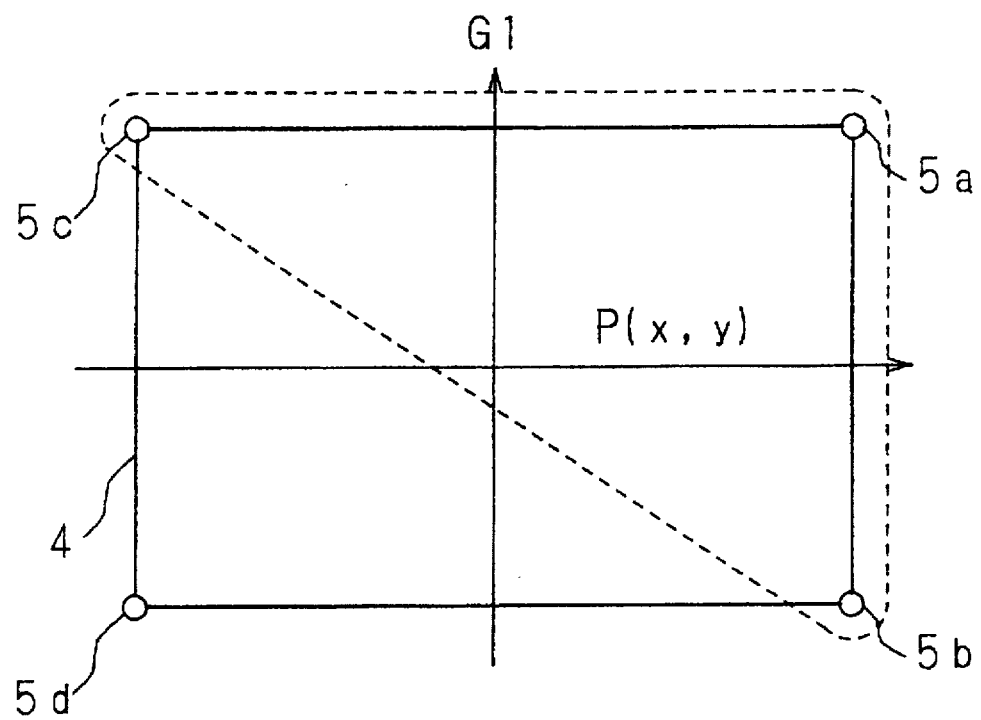
FIG. 16 is a drawing explaining an example of selection of the ultrasonic wave receivers to be used.

FIG. 16 shows the first example of selecting the ultrasonic wave receivers 5. In the first example, the ultrasonic propagating medium 4 has the ultrasonic wave receivers 5a, 5b, 5c, 5d, one of which being installed at each of the four corners thereof. In this case, the three ultrasonic wave receivers 5 selected can be combined in four sets, G1 through G4. Thus accuracy of calculating the coordinates can be improved by taking the mean value of four pairs of coordinates calculated from the four combinations.

Figure 17:
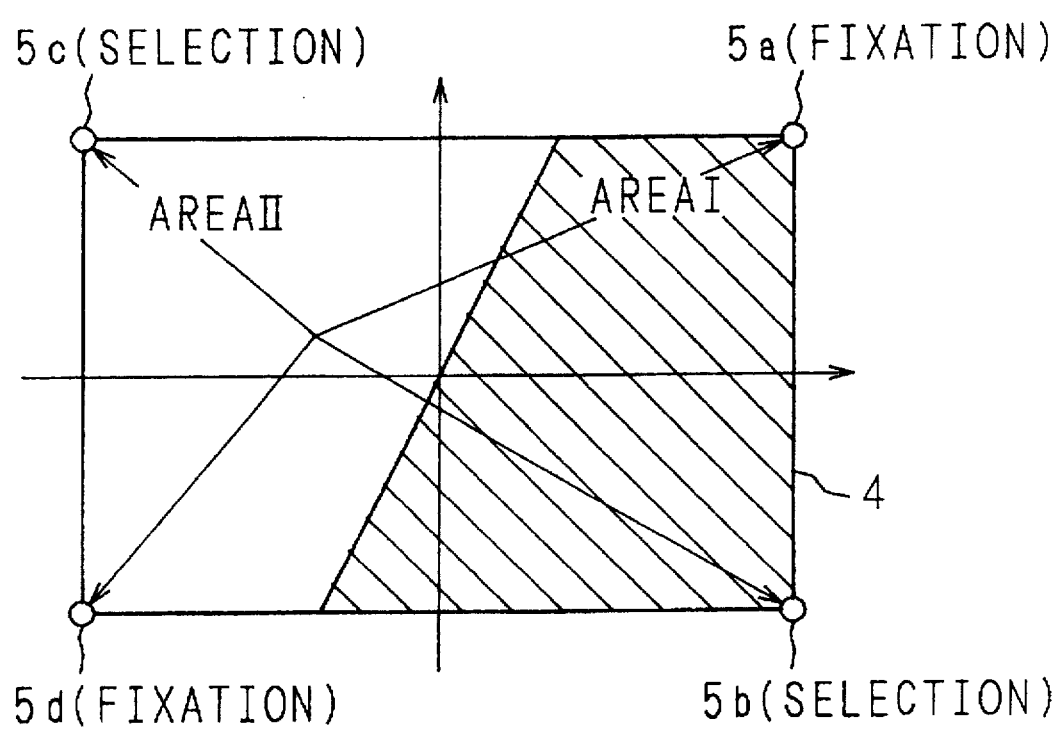
FIG. 17 is a drawing explaining another example of selection of the ultrasonic wave receivers to be used.

As the ultrasonic pen 1 is located more distant from the ultrasonic wave receiver 5, the sensitivity of receiving ultrasonic wave signals decreases resulting in increased errors in detection of rising edges. Therefore, it is preferable that the ultrasonic wave receivers 5 for the calculation of the coordinates are as near to the ultrasonic pen 1 as possible. FIG. 17 shows the second example of selecting the ultrasonic wave receivers 5. In the second example, two ultrasonic wave receivers 5a, 5d are invariably used, and one located nearer to the ultrasonic pen 1 namely one with less difference in the receiving time and earlier in the receiving timing is selected for the remaining ultrasonic wave receiver 5. Making reference to FIG. 17, the ultrasonic wave receiver 5b is used when the ultrasonic pen 1 is located within an area I, and the ultrasonic wave receiver 5c is used when the ultrasonic pen 1 is located within an area II, to calculate the coordinates.

Although two of the three ultrasonic wave receivers 5 are invariably used in the example shown in FIG. 17, only one ultrasonic wave receiver 5 may be invariably used while selecting two of earlier receiving timing. This makes it possible to calculate coordinates with further higher accuracy.

Embodiment 2

Figure 18:
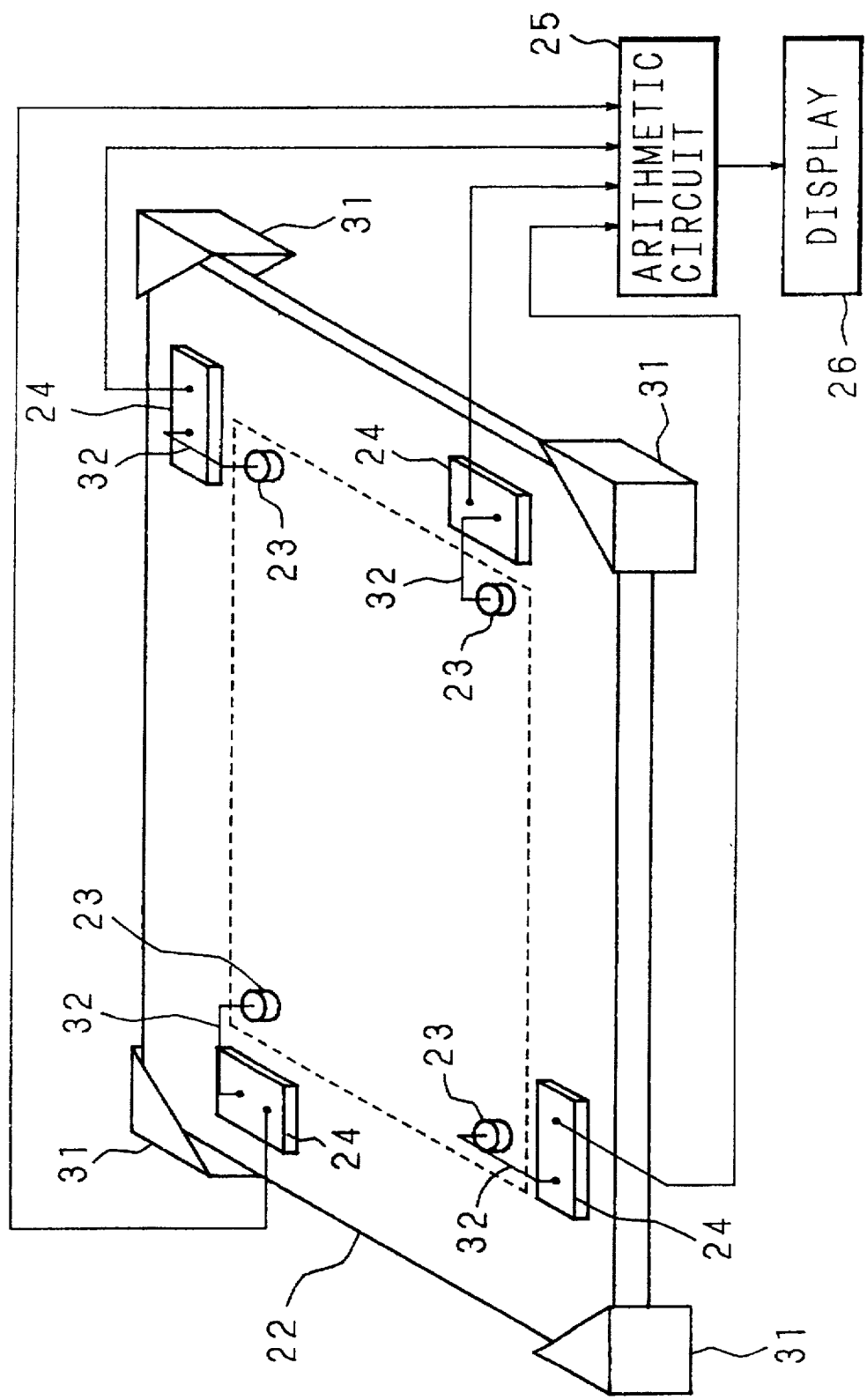
FIG. 18 is a drawing showing the configuration of an embodiment of the ultrasonic coordinate input apparatus of the invention.

FIG. 18 is a drawing showing the configuration of the second embodiment of the ultrasonic coordinate input apparatus of the invention. In the drawing, numeral 22 denotes an ultrasonic propagating medium for propagating ultrasonic wave. The ultrasonic propagating medium 22 is made of a glass or acrylic sheet. The ultrasonic propagating medium 22 has receiving sensors (receiving piezoelectric oscillators) 23 installed on the four corners thereof by bonding or pressing. The area of ultrasonic wave input is within a rectangle (indicated by dashed line) surrounded by the four receiving sensors 23. Four corners of the ultrasonic propagating medium 22 are covered by propagating medium mounting members 31 to mount the ultrasonic propagating medium 22 on a display 26. Four ultrasonic wave detection circuits 24 including pre-amplifiers are installed on the ultrasonic propagating medium 22 a little nearer to the periphery than the receiving sensors 23, while the ultrasonic wave detection circuits 24 are connected to the corresponding receiving sensors 23 by means of wires 32. The ultrasonic wave detection circuits 24 are also connected to an arithmetic circuit 25 installed outside the ultrasonic propagating medium 22, while the display 26 is connected to the arithmetic circuit 25.

Figure 1:
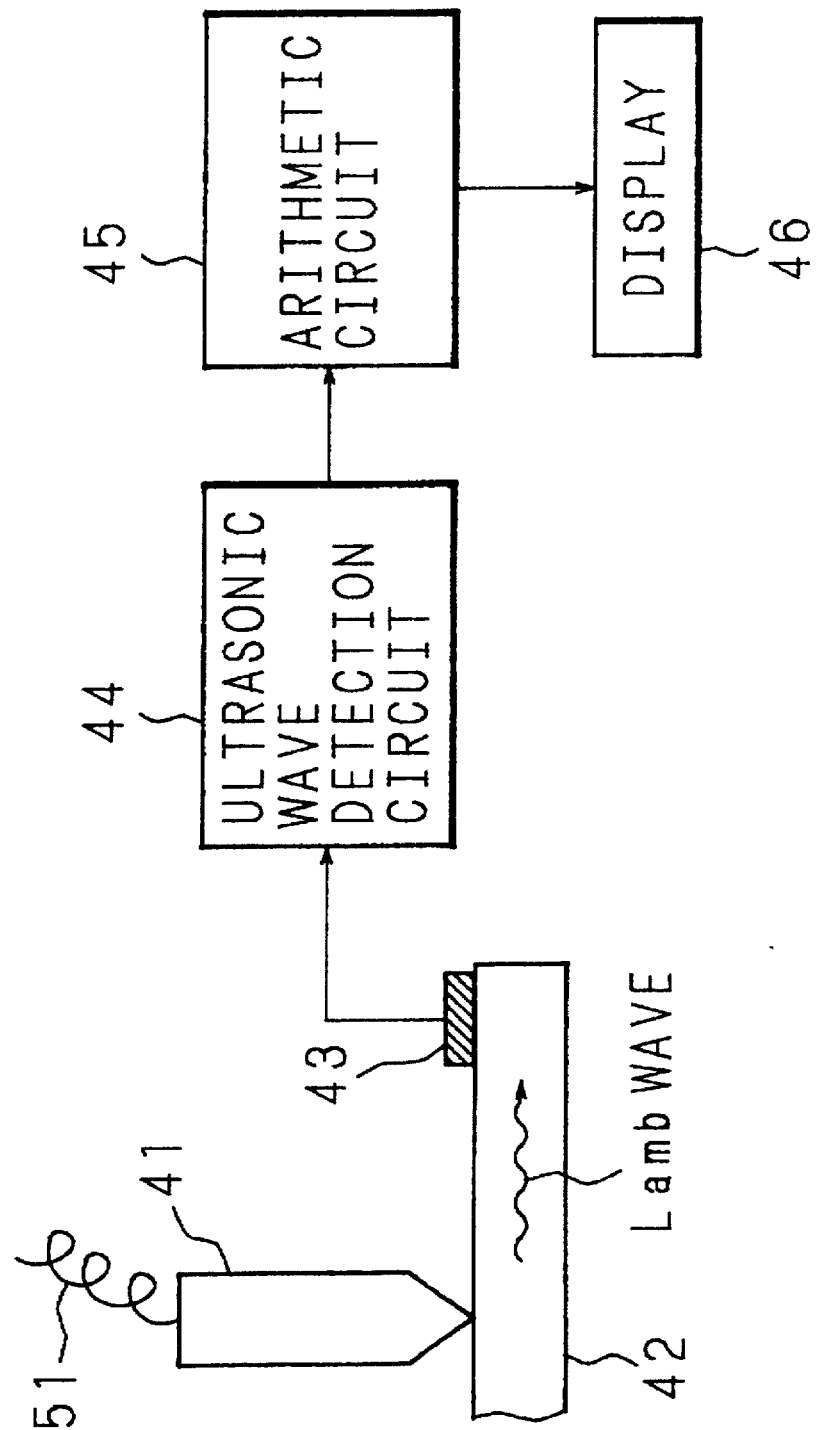
FIG. 1 is a schematic drawing showing the basic configuration of an ultrasonic coordinate input apparatus.
Figure 2A:
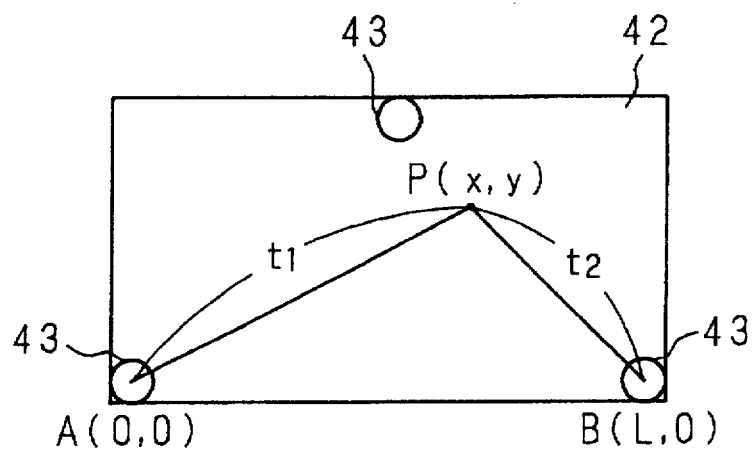
FIGS. 2A, B are drawings explaining the principle of coordinate detection in the ultrasonic coordinate input apparatus.
Figure 2B:
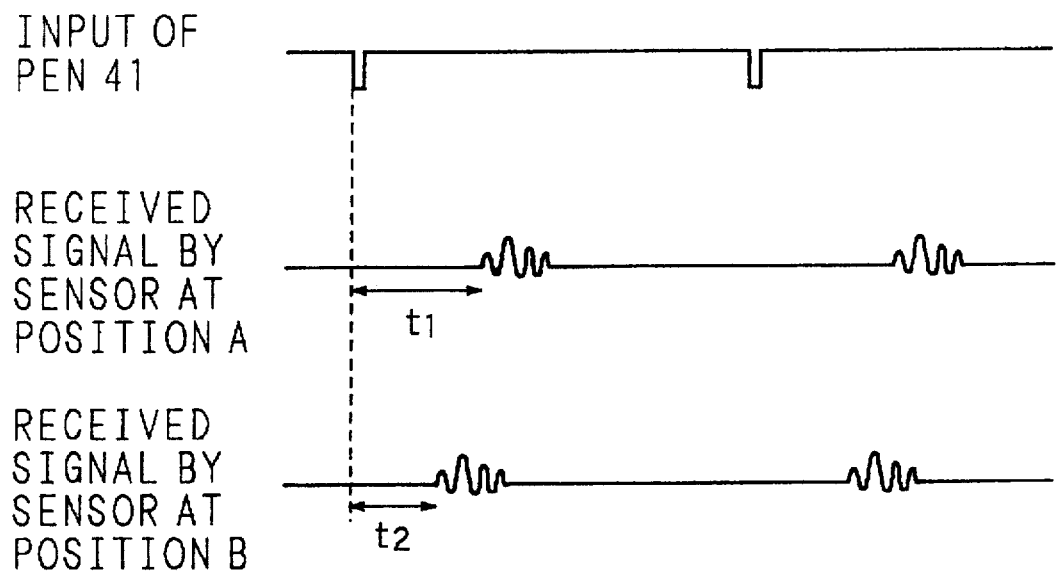
Figure 3:
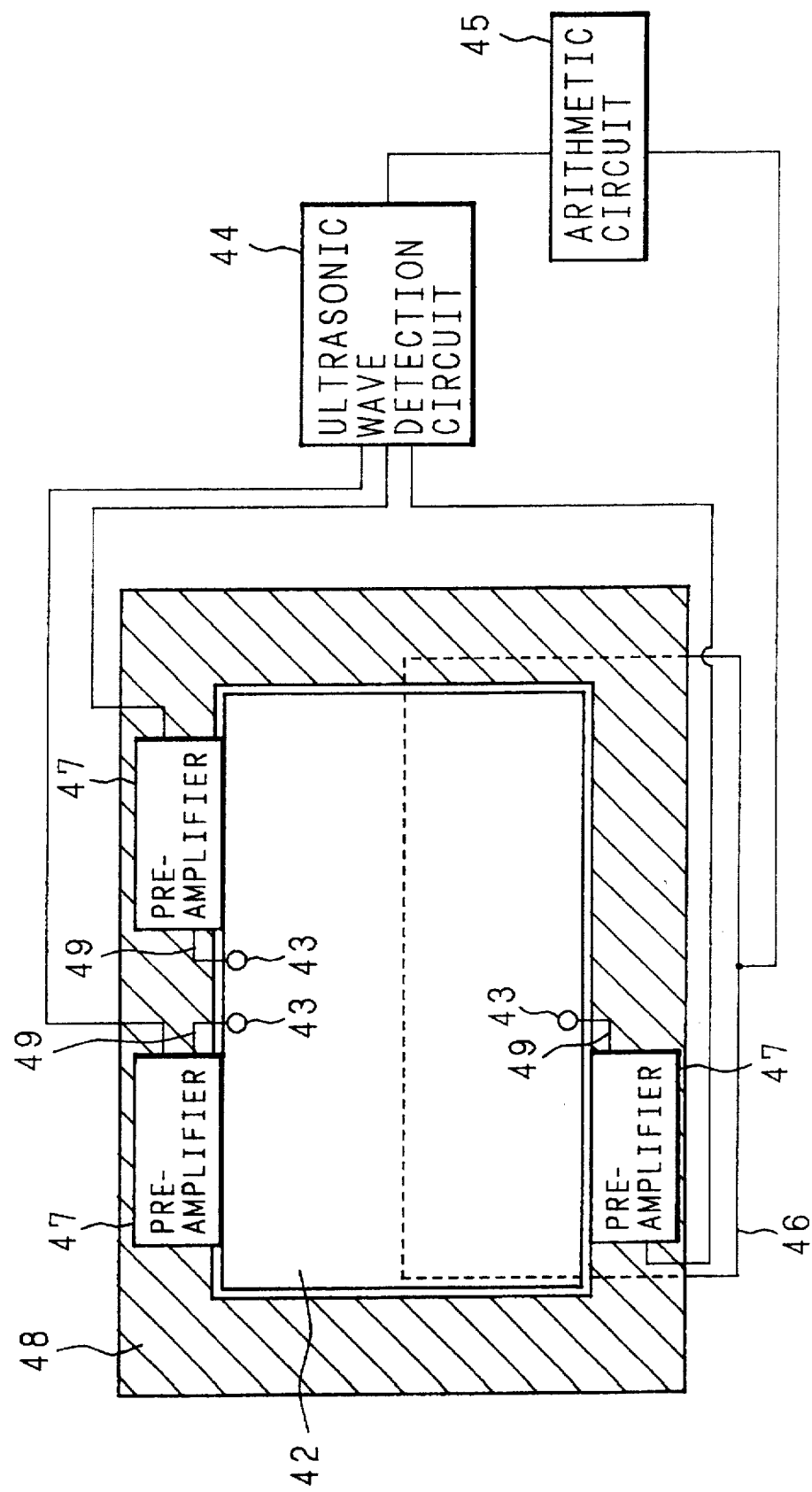
FIG. 3 is a drawing showing the configuration of an ultrasonic coordinate input apparatus of the prior art.
Figure 4:
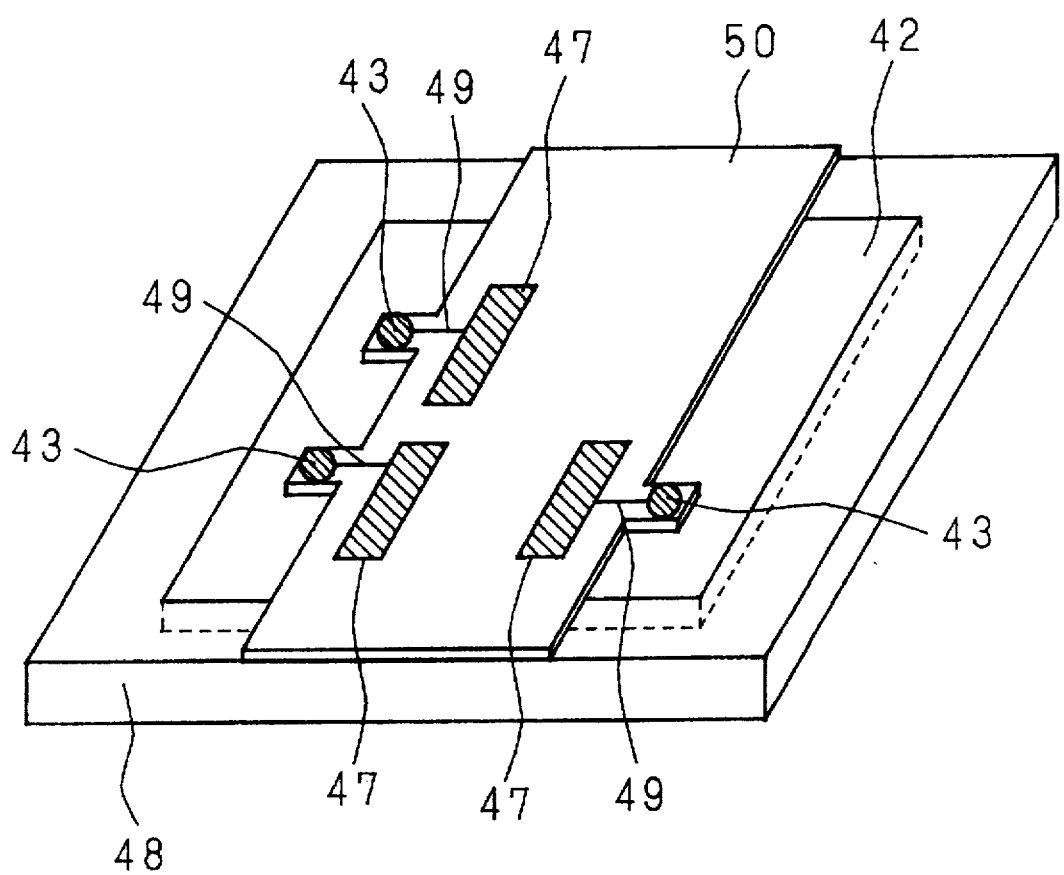
FIG. 4 is a drawing showing the configuration of another ultrasonic coordinate input apparatus of the prior art.

Now the operation will be described. Ultrasonic wave is inputted to the ultrasonic propagating medium 22 by means of ultrasonic input means (for example, ultrasonic pen 1 shown in FIG. 1). The inputted ultrasonic wave propagates in the ultrasonic propagating medium 22. The propagated ultrasonic wave is received by the receiving sensors 23 and the received signals are outputted to the corresponding ultrasonic wave detection circuits 24. The ultrasonic wave detection circuits 24 detect the ultrasonic waves received by the corresponding receiving sensors 23 and output the detected signals to the arithmetic circuit 25. The arithmetic circuit 25 calculates the coordinates according to the procedure described previously on the basis of the plurality of signals detected by the ultrasonic wave detection circuits 24. The calculated coordinates are displayed on the display 26.

As described above, because the ultrasonic wave receiving circuits 24 are installed in close proximity to the receiving sensors 23 on the ultrasonic propagating medium 22 in the second embodiment as shown in FIG. 18, it, is not necessary to have an area of circuitry on the propagating medium mounting member as in the prior art, and therefore the ultrasonic coordinate input apparatus can be reduced in size. Also it is not necessary to make the propagating medium mounting member 31 used to mount the ultrasonic propagating medium 22 on the display 26 in such a configuration that it surrounds the entire circumference of the ultrasonic propagating medium 22 as indicated in the description of the prior art. Instead, the propagating medium mounting members 31 may be provided at only the four corners as shown in FIG. 18 and the ultrasonic coordinate input apparatus can be reduced in size. Further because the ultrasonic wave detection circuits 24 including the pre-amplifiers and the like can be installed in close proximity to the receiving sensors 23, the wires 32 that connect the ultrasonic wave detection circuits 24 and the receiving sensors 23 may be short, without the need for the wires as long as several tens of millimeters as used in the prior art, thus making it possible to make a circuit insensitive to noise.

Embodiment 3

Figure 19:
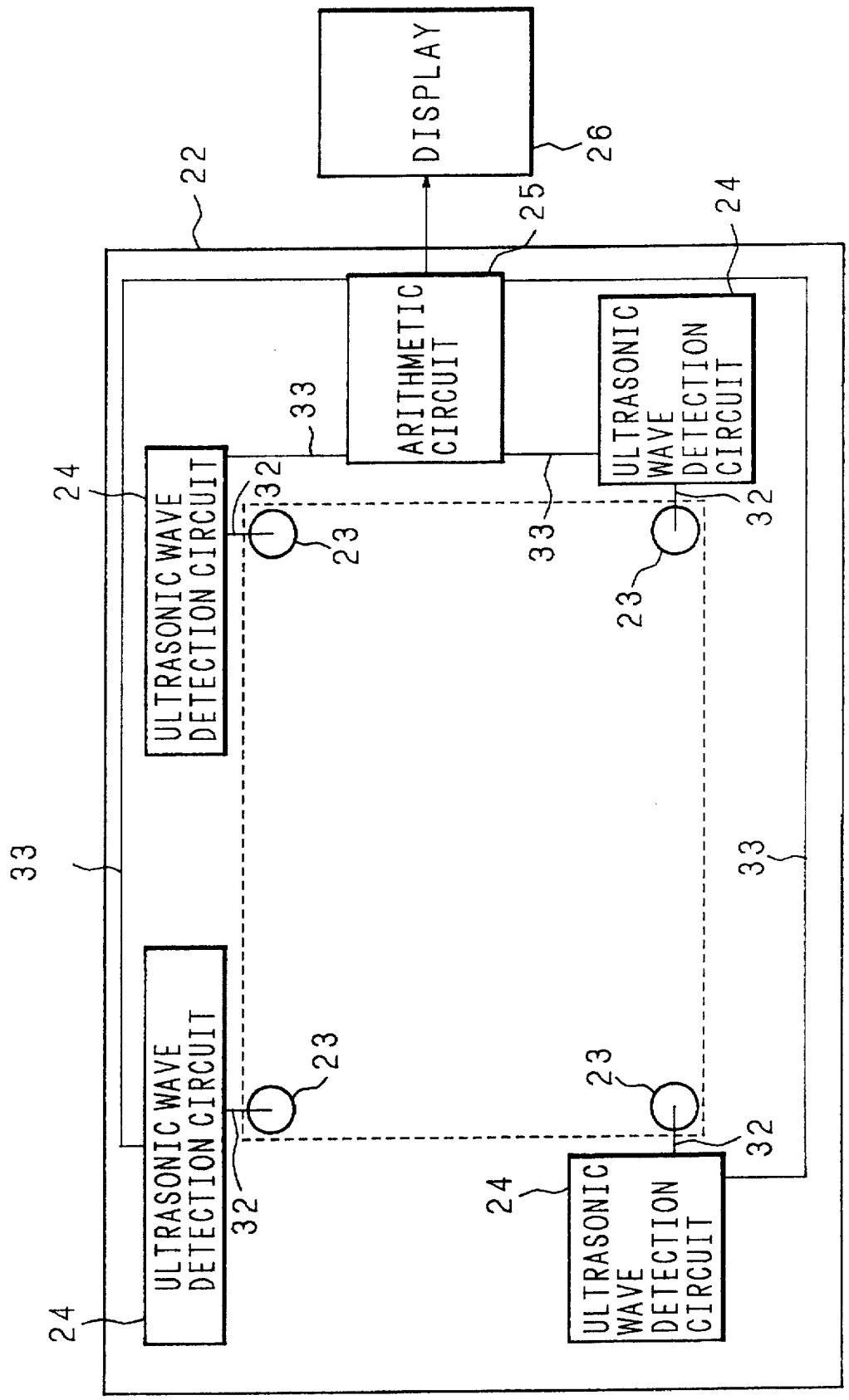
FIG. 19 is a drawing showing the configuration of another embodiment of the ultrasonic coordinate input apparatus of the invention.

FIG. 19 is a drawing showing the configuration of the third embodiment of the ultrasonic coordinate input apparatus of the invention. In FIG. 19, components identical with those shown in FIG. 18 will be assigned with the same numerals and a description thereof will be omitted. In the third embodiment, the arithmetic circuit 25 and a wiring pattern 33 that connects the ultrasonic wave detection circuit 24 and the arithmetic circuit 25, in addition to the four ultrasonic wave detection circuits 24, are also installed on the ultrasonic propagating medium 22. The rest of the configuration is the same as that of the second embodiment shown in FIG. 18. The operation is also similar to that of the second embodiment, and therefore a description thereof will be omitted.

In the third embodiment, because the arithmetic circuit 25 is also arranged on the ultrasonic propagating medium 22, it is not necessary to install the arithmetic circuit 25 outside the ultrasonic propagating medium 22 thus making it possible to reduce the apparatus size compared to the second embodiment.

Figure 20:
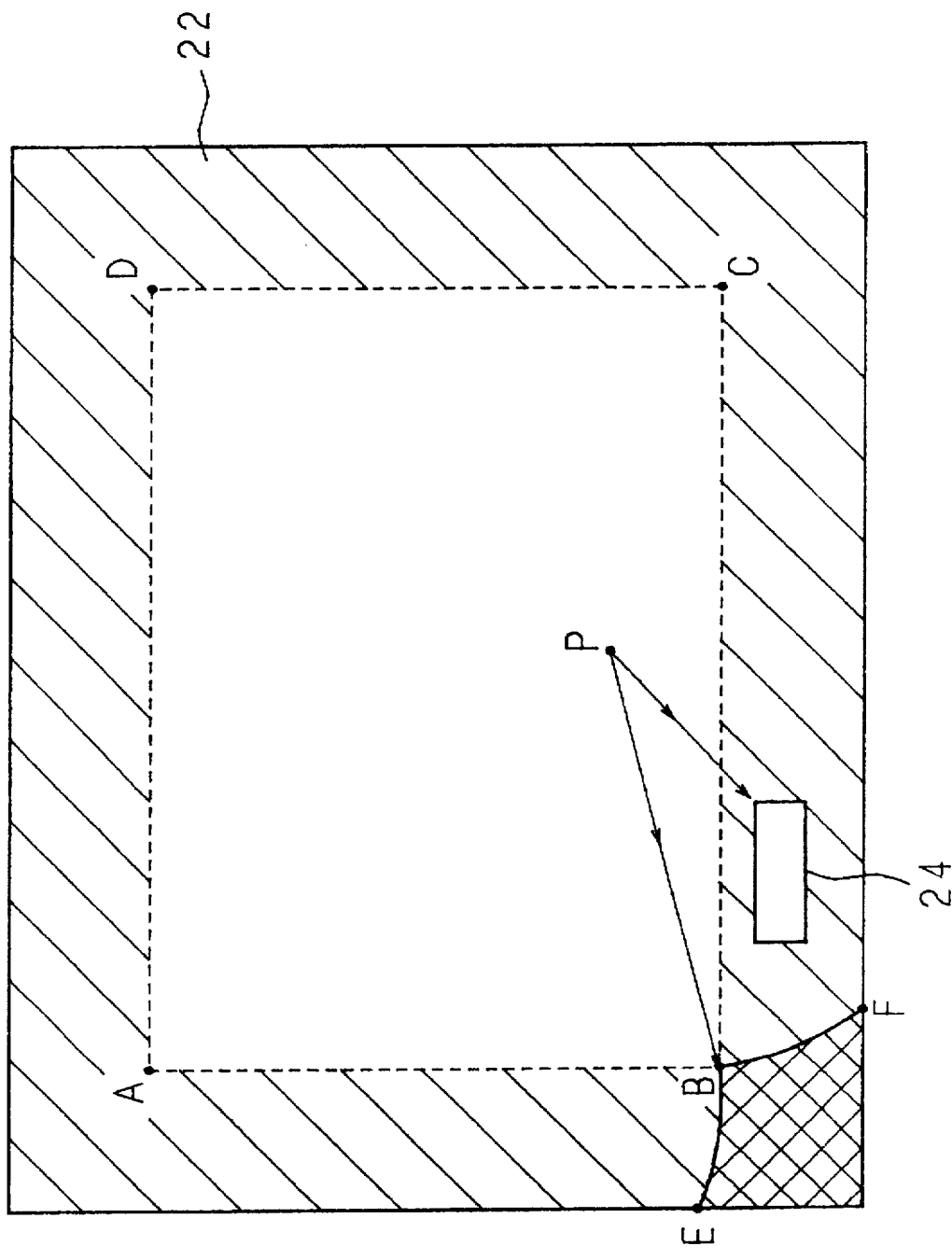
FIG. 20 is a drawing showing the area to install an ultrasonic wave detection circuit and an arithmetic circuit in the ultrasonic coordinate input apparatus of the invention.

FIG. 20 is a drawing showing the area wherein either only the ultrasonic wave detection circuit 24 or both of the ultrasonic wave detection circuit 24 and the arithmetic circuit 25 are installed on the ultrasonic propagating medium 22 in the second or the third embodiment described above. In the drawing, letters A, B, C, D denote the positions where the four receiving sensors 23 are installed. In FIG. 20, the area with single direction hatching and the area with cross hatching are the areas where the ultrasonic wave detection circuit 24 and the arithmetic circuit 25 are installed. These installation areas are set to be out of the region defined by the positions A, B, C, D where the receiving sensors 23 are installed, and out of the ultrasonic wave input area.

When the areas where the ultrasonic wave detection circuit 24 and the arithmetic circuit 25 are installed are set as described above, the problem that the display 26 is blocked by the printed circuit board, circuitry or the like when the ultrasonic propagating medium 22 is placed on the display 26 as in the case of the prior art is not experienced, and such a problem as the display cannot be seen will never occur. It is needless to say that such problems as increased parallax and decreased transmittance do not occur at all, because no substrates nor panels are interposed between the display 26 and the ultrasonic propagating medium 22.

In the case where the region defined by A, B, C, D are set to be the ultrasonic wave input area, when attention is paid to the receiving sensor 23 located at B with the input position at point P, for example, the ultrasonic wave reaches the ultrasonic wave detection circuit 24, for example, before reaching the receiving sensor 23. The ultrasonic wave that has reached the ultrasonic wave detection circuit 24 may become noise. However, such a problem will be completely eliminated by setting the region out of the arc BF defined by a circle having center at point C and radius CB and out of the arc BE defined by a circle having center at point A and radius AB as the area where the ultrasonic wave detection circuit 24 and the arithmetic circuit 25 are installed. Actually, since there may be a case where the receiving sensors 23 are not points and the ultrasonic wave input area does not correspond with the area defined by the receiving sensors 23, the area where the ultrasonic wave detection circuit 24 and the arithmetic circuit 25 are installed may be appropriately set.

Although the above description deals with such a case as four receiving sensors (receiving piezoelectric oscillators) 23 are provided for receiving ultrasonic wave propagated through the ultrasonic propagating medium 22, it is needless to say that the number of receiving sensors is not limited to four, because two or more receiving sensors are sufficient to determine a pair of coordinates.

Embodiment 4

Figure 21:
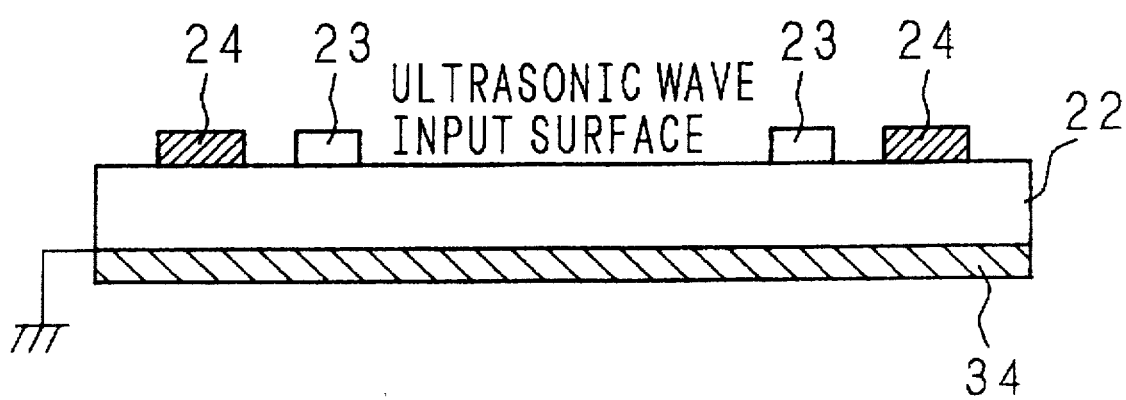
FIG. 21 is a cross sectional view of further another embodiment of the ultrasonic coordinate input apparatus of the invention.

FIG. 21 is a cross sectional view of the fourth embodiment of the ultrasonic coordinate input apparatus of the invention. Installed on the ultrasonic wave input surface of the ultrasonic propagating medium 22 are the receiving sensor 23 and the ultrasonic wave detection circuit 24 (and also the arithmetic circuit 25 in some cases), and formed on a surface (lower surface in FIG. 21) opposite to the ultrasonic wave input surface of the ultrasonic propagating medium 22 is a conductive film 34 made of ITO or the like with one end thereof being grounded.

There may be such a case as the ultrasonic coordinate input apparatus is installed on an electromagnetic noise generating display such as plasma display. In such a case, high voltage discharge occurs to cause the electromagnetic noise to enter the circuitry directly, resulting in significant noise picked up even when the wire 32 is made shorter as shown in the second and third embodiments. In the fourth embodiment, because the surface on the display side opposite to the ultrasonic wave input surface is coated with a transparent conductive film 34 that is grounded, the ultrasonic coordinate input apparatus can be shielded from electromagnetic noise when it is installed on a display generating electromagnetic noise.

Figure 22A:
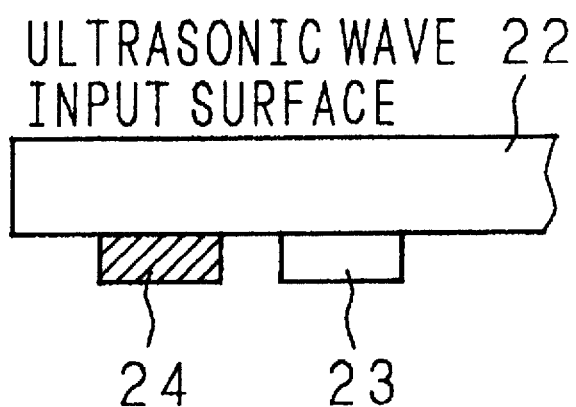
FIGS. 22A, B are cross sectional views of a variation f the ultrasonic coordinate input apparatus of the invention.
Figure 22B:
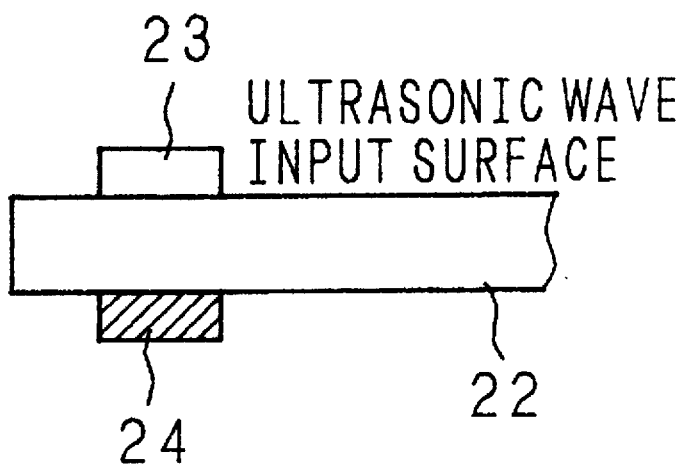

Although in the embodiments described above, descriptions are given to such cases as both the receiving sensor 23 and the ultrasonic wave detection circuit 24 (and also the arithmetic circuit 25 in some cases) are mounted on the ultrasonic wave input, surface of the ultrasonic propagating medium 22, the mounting surface is not limited to this. For example, both the receiving sensor 23 and the ultrasonic wave detection circuit 24 (and also the arithmetic circuit 25 in some cases) may be mounted on the surface opposite to the ultrasonic wave input surface of the ultrasonic propagating medium 22, as shown in FIG. 22A. Further, the receiving sensor 23 and the ultrasonic wave detection circuit 24 (and also the arithmetic circuit 25 in some cases) may also be mounted separately on the front surface and the back surface of the ultrasonic propagating medium 22, respectively, as shown in FIG. 22B. In the example of mounting arrangement shown in FIG. 22B, in particular, the ultrasonic coordinate input apparatus can be further reduced in size because the area of composing the circuitry can be reduced compared to the case of mounting on the same surface.

Figure 23A:
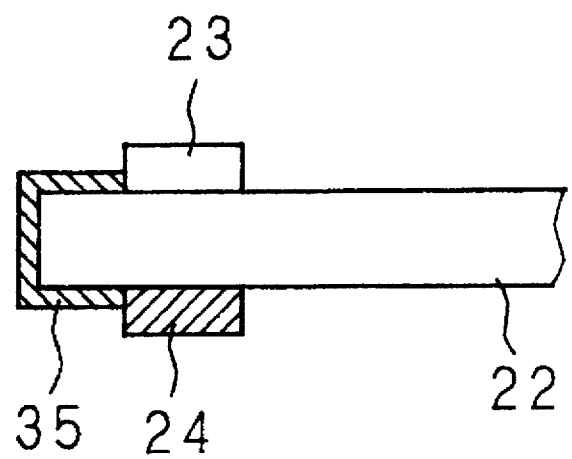
FIGS. 23A, B are cross sectional views showing an example of connecting a receiving sensor and the ultrasonic wave detection circuit in the ultrasonic coordinate input apparatus of the invention.
Figure 23B:
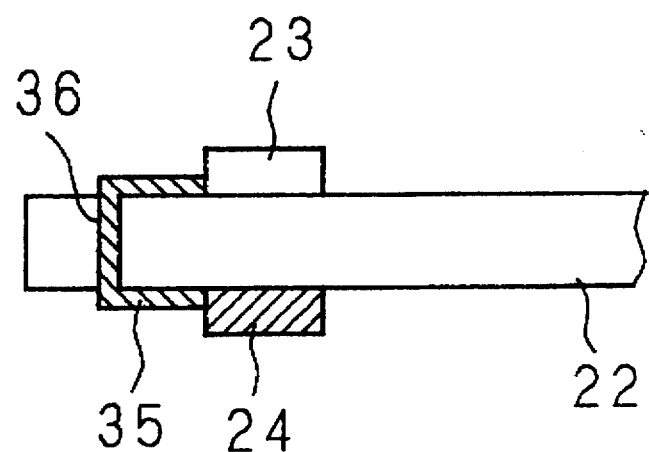

As shown in FIG. 22B, in the case of mounting the receiving sensor 23 and the ultrasonic wave detection circuit 24 on different surfaces of the ultrasonic propagating medium 22 there are two methods for connecting the receiving sensor 23 and the ultrasonic wave detection circuit 24. One of the methods is to connect the receiving sensor 23 and the ultrasonic wave detection circuit 24 by forming such a wiring pattern 35 that goes round the edge of the ultrasonic propagating medium 22 as shown in FIG. 23A. Another method is to pass the wiring pattern 35 through a through hole 36 formed in the ultrasonic propagating medium 22 to make the connection as shown in FIG. 23B.

In the embodiments described above, ultrasonic wave detection circuit 24 and/or the arithmetic circuit 25 can be composed on the ultrasonic propagating medium 22 thereby to reduce the entire apparatus in size, by receiving the S0 wave having the fastest speed among the Lamb waves of propagating in the ultrasonic propagating medium 22.

Figure 25:
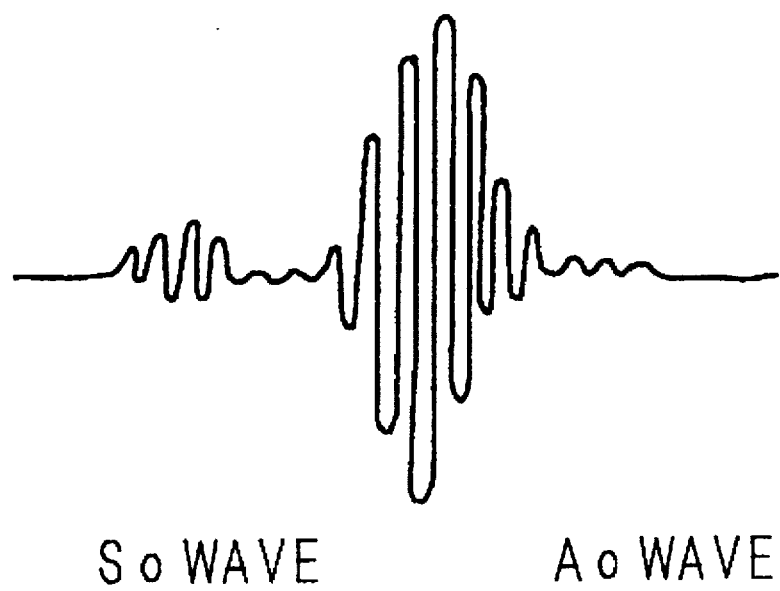
FIG. 25 is a waveform chart of Lamb wave.

The Lamb wave propagating in the ultrasonic propagating medium consists of S wave having vibration that is symmetrical with respect to the center line (dashed line) of the propagating medium and the A wave that is asymmetrical as shown in FIG. 24. In the ultrasonic coordinate input apparatus of the prior art, the A0 wave that has greater amplitude is received among the basic components of S0 wave and A0 wave shown in FIG. 25. However, because the A0 wave is slower than the S0 wave, it is necessary to install an ultrasonic wave absorber around the ultrasonic propagating medium for absorbing unnecessary ultrasonic wave, in order to eliminate the influence of reflection of the S0 wave at the end of the ultrasonic propagating medium. Consequently, the ultrasonic wave detection circuit and the arithmetic circuit must be mounted in or outside the ultrasonic wave absorber. According to the invention, because the S0 wave having the fastest propagating speed among the Lamb waves is received, unnecessary ultrasonic waves reflecting at the edges of the ultrasonic propagating medium can be ignored to make the ultrasonic wave absorber around the ultrasonic propagating medium unnecessary and, as described previously, it is made possible to constitute the ultrasonic wave detection circuit and/or the arithmetic circuit on the ultrasonic propagating medium.

Figure 26A:
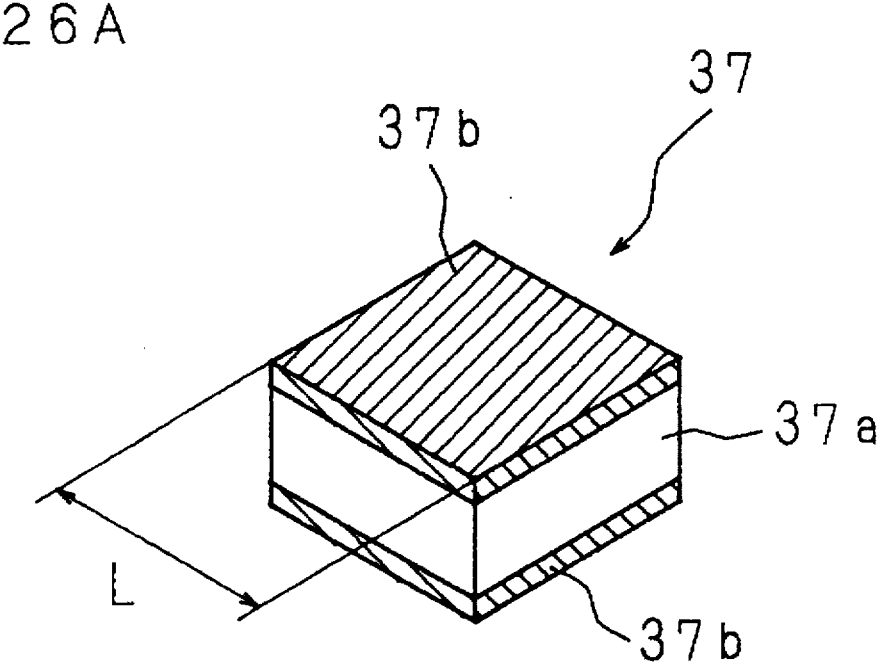
FIGS. 26A, B are cross sectional views showing the configuration of a piezoelectric oscillator that is an ultrasonic wave receiving element.
Figure 26B:
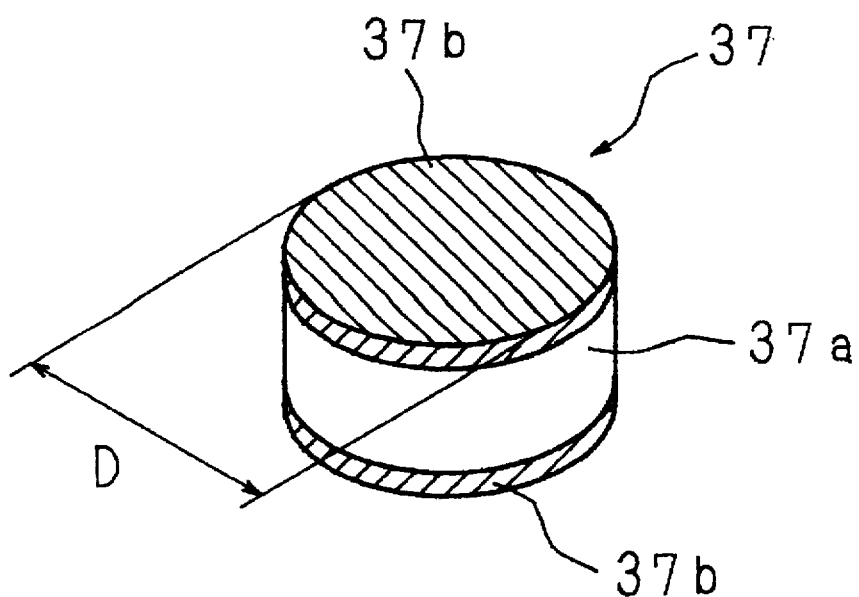

When a piezoelectric oscillator is used as an ultrasonic wave receiving element (the ultrasonic wave receiver 5 or the receiving sensor 23 in the above embodiments), the piezoelectric oscillator 37 is made by forming electrodes 37a, 37b on the front and back sides of the piezoelectric oscillator 37a made of PZT-based piezoelectric ceramics, for example, as shown in FIGS. 26A, B. The piezoelectric oscillator 37 is made in a configuration of square prism as shown in FIG. 26A or cylinder as shown in FIG. 26B. While any of these configurations may be selected, selection of the square prism leads to cost reduction because a number of pieces of a desired shape can be easily manufactured from a large oscillator sheet. Selection of cylindrical configuration, on the other hand, results in non-directional receiving sensitivity, thereby making the oscillator desirable as a receiving element.

Further, the receiving sensitivity can be improved by setting the length of one edge of the basal plane to L in the case of square prism, or setting the diameter D in the case of a cylinder to one half of the wavelength of the ultrasonic wave propagating in the piezoelectric oscillator or one half of the wavelength of the ultrasonic wave propagating in the ultrasonic propagating medium depending on the material of the ultrasonic propagating medium or the like. As a matter of course, it is desirable to set the height or thickness of the piezoelectric oscillator to such a dimension that is negligible compared to L or D in the aspect of acoustics (with regards to frequency).

Figure 27:
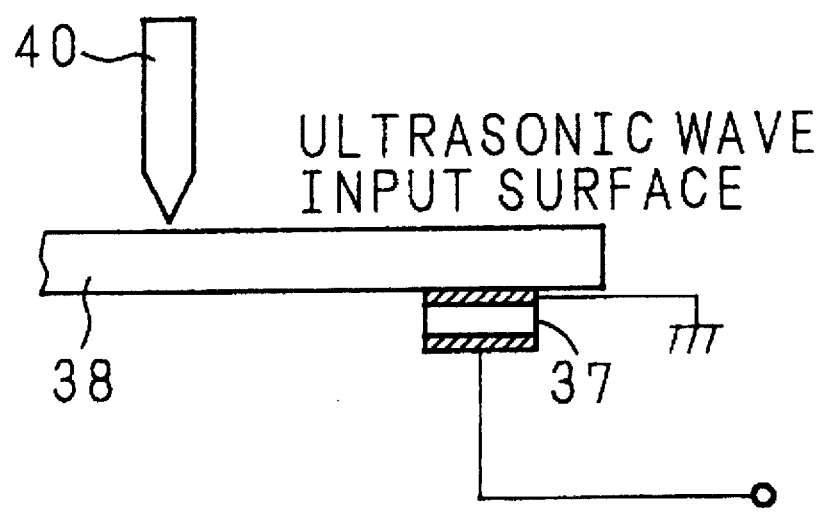
FIG. 27 is a cross sectional view showing an example of installing the piezoelectric oscillator on the ultrasonic propagating medium.

When such a structure is employed as all the piezoelectric oscillators 37 are disposed on the surface opposite to the ultrasonic wave input surface of the ultrasonic propagating medium 38 whereon the ultrasonic pen 40 makes contact as shown in FIG. 27 in the embodiments described above, there exists no projecting portions over the entire ultrasonic wave input surface, thereby making it possible to keep the height above the ultrasonic wave input surface low when forming a frame, for example, thus eliminating such a problem that the frame makes an obstacle against input.

Figure 28:
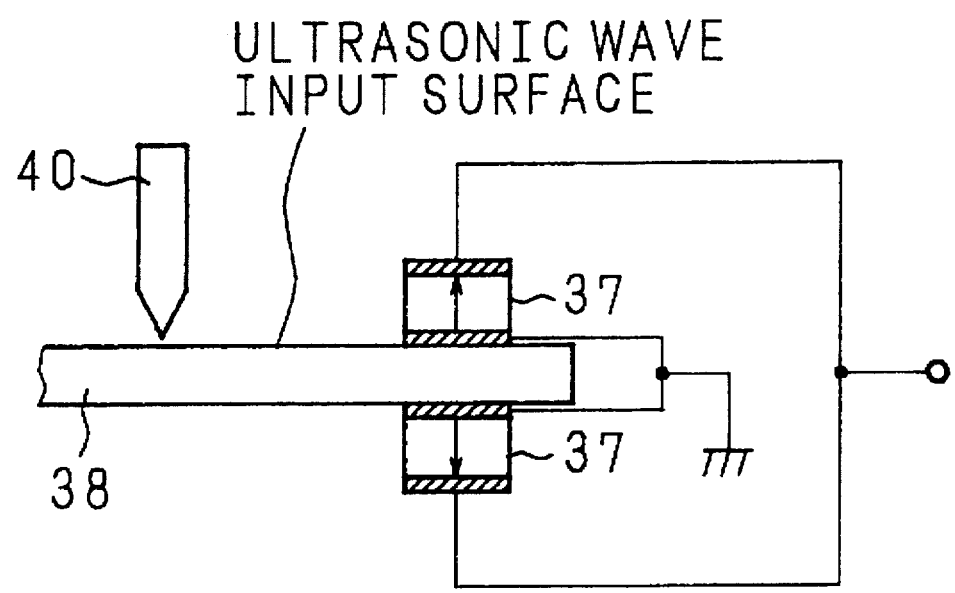
FIG. 28 is a cross sectional view showing an example of installing the piezoelectric oscillator on the ultrasonic propagating medium.
Figure 29:
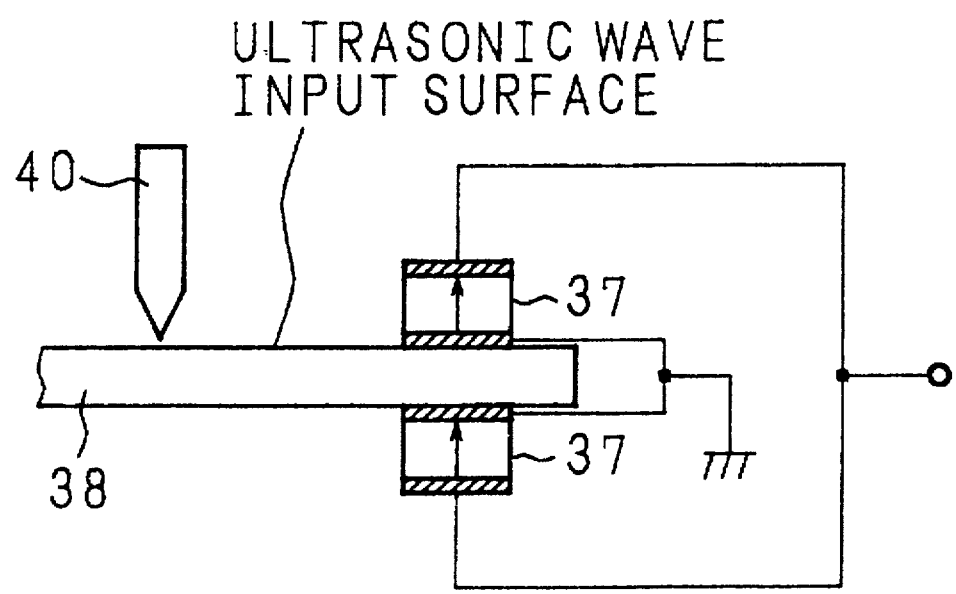
FIG. 29 is a cross sectional view showing an example of installing the piezoelectric oscillator on the ultrasonic propagating medium.

When the piezoelectric oscillators 37 having polarization oriented as shown in FIG. 28, for example, are disposed on the front and back surfaces (ultrasonic wave input surface and a surface opposite thereto) of the ultrasonic propagating medium 38, influence of the A wave of higher level can be eliminated, making it possible to positively receive the S wave having faster propagating speed. When the A wave is positively received by eliminating the influence of the S wave, on the other hand, the piezoelectric oscillators 37 having polarization oriented as shown in FIG. 29, for example, are disposed on the front and back surfaces of the ultrasonic propagating medium 38.

Figure 30:
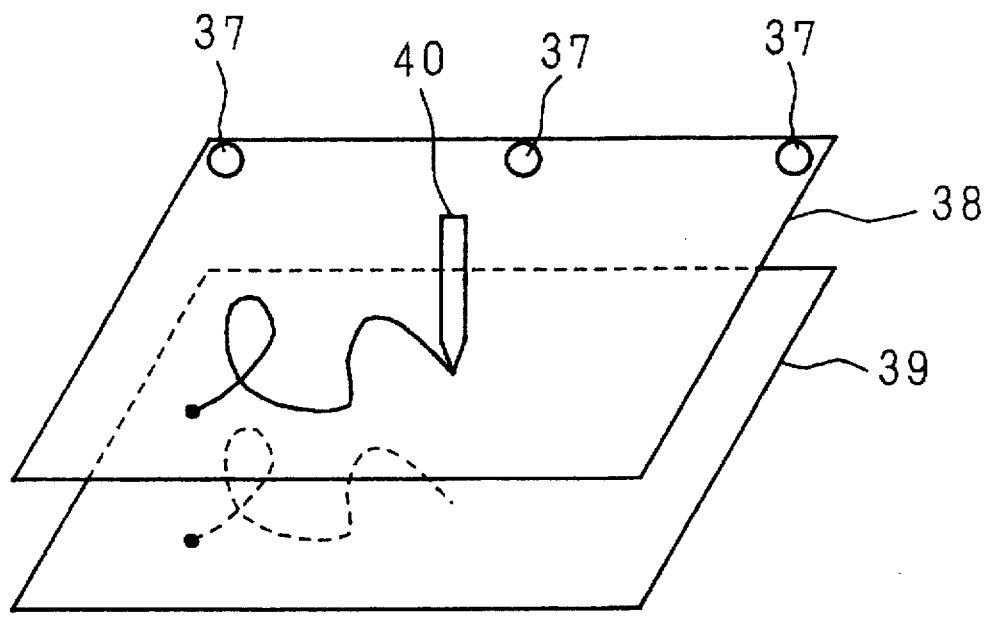
FIG. 30 is a schematic diagram showing an example of mounting the ultrasonic propagating medium on a display device.

Further, the ultrasonic coordinate input apparatus may be used as one tablet to display the detected coordinate data on another display device. When a transparent material such as glass, epoxy resin and acrylic resin is used for the ultrasonic propagating medium 38 as shown in FIG. 30, the applications of the invention are expanded to a word processor, a CAD and others as well as a pen input computer, by placing the ultrasonic propagating medium 38 on the display device 39.

Also in the case of pen input of ultrasonic wave according to the invention, the ultrasonic propagating medium is made in such a simple configuration that merely a plurality of receiving elements are arranged by means of, for example, an ordinary soda glass. Further, because such a process of forming a special electrode is not required unlike other electromagnetic induction method and resistive membrane method, no change is caused in the configuration even when the display device becomes large in size, not to mention a case of a small display. Therefore, such a problem as the decrease of yield due to the process of forming electrode does not, occur at all when manufacturing an apparatus for an especially large display device.

Further, because small amount of deflection of the ultrasonic propagating medium has no significant effect on the propagation characteristic of ultrasonic wave, no problem arises with a plasma display device and a liquid crystal display device having a flat screen and CRT having a curved screen surface.

According to the invention, as described above, because the difference in time of receiving the ultrasonic wave between the ultrasonic wave receivers is measured and coordinates of the ultrasonic wave input position are calculated based on the result of measurement, it becomes unnecessary to connect the ultrasonic pen and the main unit with a cord, making it possible to realize a cordless ultrasonic coordinate input apparatus having excellent operability.

Also according to the invention, because the ultrasonic wave detection circuit and the arithmetic circuit are mounted on the ultrasonic propagating medium, the mounting members for mounting the ultrasonic propagating medium on the display can be significantly reduced in size and the manufacturing cost can be reduced, while a circuitry having higher resistance against noise can be realized. Consequently, improvement of the S/N ratio leads to improved accuracy of detecting the input position and elimination of coordinate input error, enabling smooth display of handwritten letters and diagrams.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:

at least three ultrasonic wave receivers installed at arbitrarily selected different positions of the ultrasonic propagating medium;

measuring means for measuring the difference in time of receiving the ultrasonic wave between said ultrasonic wave receivers; and calculating means for calculating the coordinates of the ultrasonic wave input position based only on the difference in time of receiving the ultrasonic wave between said ultrasonic wave receivers measured by said measuring means.

2. An ultrasonic coordinate input apparatus as claimed in claim 1, wherein said ultrasonic wave receivers receive the rising edge of the first crest of symmetrical plate wave that is the fastest among ultrasonic waves propagating in the ultrasonic propagating medium.

3. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:

at least three ultrasonic wave receivers installed at arbitrarily selected different positions of the ultrasonic propagating medium;

measuring means for measuring the difference in time of receiving the ultrasonic wave between said ultrasonic wave receivers; and calculating means for calculating the coordinates of the ultrasonic wave input position on the basis of the result of measurement by said measuring means;

wherein
said ultrasonic wave receivers receive the symmetrical plate wave that is the fastest among ultrasonic waves propagating in the ultrasonic propagating medium,
detecting means is provided for full-wave rectifying the symmetrical plate wave received by the ultrasonic wave receivers and detecting the rising edge of the first crest or envelope component of the rectified wave,
and said measuring means measures the difference in time of receiving the ultrasonic wave between said ultrasonic wave receivers according to the result of detection by said detecting means.

4. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:
at least three ultrasonic wave receivers installed at arbitrarily selected different positions of the ultrasonic propagating medium;
measuring means for measuring the difference in time of receiving the ultrasonic wave between said ultrasonic wave receivers; and
calculating means for calculating the coordinates of the ultrasonic wave input position on the basis of the result of measurement by said measuring means;
further comprising:
recognizing means for recognizing a movement of the ultrasonic wave input means according to whether ultrasonic wave is received by said ultrasonic wave receivers within a predetermined period of time or not;
wherein the predetermined period of time is set to the greatest difference in receiving time between said ultrasonic wave receivers or an integral multiple thereof, or alternatively a longer period of time.

5. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:
at least three ultrasonic wave receivers installed at arbitrarily selected different positions of the ultrasonic propagating medium;
measuring means for measuring the difference in time of receiving the ultrasonic wave between mid ultrasonic wave receivers; and
calculating means for calculating the coordinates of the ultrasonic wave input position on the basis of the result of measurement by said measuring means;
wherein
a predetermined number of received signals immediately after the reception by said ultrasonic wave receivers are ignored and the following ultrasonic wave received signals or used to calculate the coordinates of the ultrasonic wave input position and/or recognize the movement of the ultrasonic wave input means.

6. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising;
at least three ultrasonic wave receivers installed at arbitrarily selected different positions of the ultrasonic propagating medium;
measuring means for measuring the difference in time of receiving the ultrasonic wave between said ultrasonic wave receivers; and
calculating means for calculating the coordinates of the ultrasonic wave input position on the basis of the result of measurement by said measuring means;
further comprising
an amplifier for amplifying the received signals of said ultrasonic wave receivers; and
adjusting means for adjusting the amplification factor of said amplifier according to the amplitude of the signals received by said ultrasonic wave receivers.

7. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:
at least three ultrasonic wave receivers installed at arbitrarily selected different positions of the ultrasonic propagating medium;
measuring means for measuring the difference in time of receiving the ultrasonic wave between said ultrasonic wave receivers: and
calculating means for calculating the coordinates of the ultrasonic wave input position on the basis of the result of measurement by said measuring means;
further comprising
an amplifier for amplifying the received signals of said ultrasonic wave receivers; and
adjusting means for calculating the distance between the ultrasonic wave input position and said ultrasonic wave receivers recording to the coordinates calculated by said calculating means and adjusting the amplification factor of said amplifier according to the result of calculation.

8. An ultrasonic coordinate input apparatus as claimed in claim 1, wherein
the ultrasonic wave input means is a cordless device having an oscillator for oscillating ultrasonic waves.

9. An ultrasonic coordinate input apparatus wherein an ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising: at least four ultrasonic wave receivers installed at arbitrarily selected different positions of the ultrasonic propagating medium;
measuring means for measuring the difference in time of receiving the ultrasonic wave between said ultrasonic wave receivers;
first calculating means for calculating a plurality of sets of coordinates of the ultrasonic wave input position based only on the difference in time of receiving the ultrasonic wave between said ultrasonic wave receivers measured by said measuring means for a set of the three ultrasonic wave receivers; and second calculating means for calculating the coordinates of the ultrasonic wave input position according to a plurality of results of calculation by said first calculating means.

10. An ultrasonic coordinate input apparatus as claimed in claim 9, wherein the ultrasonic wave input means is a cordless device having an oscillator for oscillating ultrasonic waves.

11. An ultrasonic coordinate input apparatus wherein in ultrasonic wave is inputted from ultrasonic wave input means to an ultrasonic propagating medium and the ultrasonic wave propagated through the ultrasonic propagating medium is received by ultrasonic wave receivers thereby to detect the coordinates of the ultrasonic wave input position on the basis of the received signals, comprising:

a plurality of ultrasonic wave receivers installed at different positions of the ultrasonic propagating medium with one or more thereof being fixed at predetermined positions; and calculating means for calculating the coordinates of the ultrasonic wave input position based only on the difference in time of receiving the ultrasonic wave between said one or more ultrasonic wave receivers fixed at the predetermined positions and one or more ultrasonic wave receivers selected from the remaining ultrasonic wave receivers.

12. An ultrasonic coordinate input apparatus as claimed in claim 11, wherein two ultrasonic wave receivers are fixed on a diagonal or one edge of the ultrasonic propagating medium.

13. An ultrasonic coordinate input apparatus as claimed in claim 11, wherein the ultrasonic wave input means is a cordless device having an oscillator for oscillating ultrasonic waves.

14. An ultrasonic coordinate input apparatus wherein an ultrasonic wave is inputted from ultrasonic wave input means to an ultrasonic propagating medium and the ultrasonic wave propagated through the ultrasonic propagating medium is received thereby to detect the coordinates of the ultrasonic wave input position on the basis of the received signals, comprising:

a plurality of piezoelectric oscillators, installed on the ultrasonic propagating medium, for receiving the ultrasonic wave propagated through the ultrasonic propagating medium;

an ultrasonic wave detection circuit, installed on the ultrasonic propagating medium, for detecting propagated ultrasonic waves from received signals of said piezoelectric oscillators; and an arithmetic circuit for calculating the coordinates of the ultrasonic wave input position on the basis of the result of detection by said ultrasonic wave detection circuit.

15. An ultrasonic coordinate input apparatus as claimed in claim 14, wherein said arithmetic circuit is also installed on the ultrasonic propagating medium.

16. An ultrasonic coordinate input apparatus as claimed in claim 14, wherein said arithmetic circuit is installed outside the region surrounded by said plurality of piezoelectric oscillators and also outside the ultrasonic wave input area.

17. An ultrasonic coordinate input apparatus as claimed in claim 14, wherein said ultrasonic wave detection circuit is installed outside the region surrounded by said plurality of piezoelectric oscillators and also outside the ultrasonic wave input area.

18. An ultrasonic coordinate input apparatus as claimed in claim 17, wherein said arithmetic circuit is installed outside the region surrounded by said plurality of piezoelectric oscillators and also outside the ultrasonic wave input area.

19. An ultrasonic coordinate input apparatus as claimed in claim 14, wherein a conductive film is provided on a surface opposite to the ultrasonic wave input surface of the ultrasonic propagating medium.

20. An ultrasonic coordinate input apparatus as claimed in claim 14, wherein said piezoelectric oscillators receive a wave having the fastest propagating speed among the ultrasonic waves propagating in the ultrasonic propagating medium.

* * * * *

UNITED STATES PATENT AND TRADEMARK OFFICE
CERTIFICATE OF CORRECTION

PATENT NO.:     5,637,839
DATED      :    June 10, 1997
INVENTOR(S):    YAMAGUCHI et al.

It is certified that error appears in the above-identified patent and that said Letters Patent is hereby corrected as shown below:

On the title page, item [57], the Abstract, is incorrect in that the comma is missplaced. The beginning of the opening sentence, "An ultrasonic coordinate input, apparatus comprising ... " should read --An ultrasonic coordinate input apparatus, comprising ...-- therefor.

Signed and Sealed this

Sixteenth Day of September, 1997

Attest:

BRUCE LEHMAN

Attesting Officer          Commissioner of Patents and Trademarks